US011394302B2

(12) United States Patent
Brown

(10) Patent No.: US 11,394,302 B2
(45) Date of Patent: Jul. 19, 2022

(54) DC-DC AUTO-CONVERTER MODULE

(71) Applicant: Terminal Power LLC, Cedarville, OH (US)

(72) Inventor: Gerald Murray Brown, Cedarville, OH (US)

(73) Assignee: Terminal Power LLC, Cedarville, OH (US)

( * ) Notice: Subject to any disclaimer, the term of this patent is extended or adjusted under 35 U.S.C. 154(b) by 0 days.

(21) Appl. No.: 17/397,892

(22) Filed: Aug. 9, 2021

(65) Prior Publication Data

US 2022/0045614 A1 Feb. 10, 2022

Related U.S. Application Data

(60) Provisional application No. 63/063,800, filed on Aug. 10, 2020.

(51) Int. Cl.
*H02M 3/22* (2006.01)
*H02M 1/00* (2006.01)

(52) U.S. Cl.
CPC .......... *H02M 3/22* (2013.01); *H02M 1/0083* (2021.05); *H02M 1/0093* (2021.05)

(58) Field of Classification Search
CPC .... H02M 1/0083; H02M 1/0093; H02M 3/22; H02M 3/24
See application file for complete search history.

(56) References Cited

U.S. PATENT DOCUMENTS 6,388,896 B1   5/2002   Cuk
6,400,579 B2   6/2002   Cuk
(Continued)

FOREIGN PATENT DOCUMENTS

JP   2002136111 A   5/2002
RU      2269859 C1   2/2006
(Continued)

OTHER PUBLICATIONS

Thomas, Shane; International Search Report and Written Opinion of the International Searching Authority, issued in International Patent Application No. PCT/US2021/045281; dated Jan. 11, 2022; 11 pages.

(Continued)

*Primary Examiner* — Gary L Laxton
(74) *Attorney, Agent, or Firm* — Ulmer & Berne LLP

(57) ABSTRACT

A DC-DC auto-converter module includes a positive source terminal, a negative source terminal, a positive load terminal, a negative load terminal, and a DC-DC converter. The negative source terminal cooperates with the positive source terminal to facilitate electrical connection of a DC power source thereto. The negative load terminal cooperates with the positive load terminal to facilitate connection of an electrical load thereto. The isolated DC-DC converter comprises an input circuit and an output circuit that is galvanically isolated from the input circuit. The DC-DC converter includes a positive input terminal, a negative input terminal, a positive output terminal, and a negative output terminal. At least one of the positive input terminal, the negative input terminal, the positive output terminal, and the negative output terminal is galvanically connected to at least one of the positive source terminal, the negative source terminal, the positive load terminal, and the negative load terminal.

9 Claims, 17 Drawing Sheets

(56) References Cited

U.S. PATENT DOCUMENTS

| | | | |
|---|---|---|---|
| 6,404,176 B1 | 6/2002 | Winick et al. | |
| 6,657,875 B1 | 12/2003 | Zeng et al. | |
| 6,765,371 B2 | 7/2004 | Kataoka | |
| 7,307,857 B2 | 12/2007 | Liu et al. | |
| 7,514,913 B2 | 4/2009 | Zhang et al. | |
| 7,778,046 B1 | 8/2010 | Cuk et al. | |
| 7,787,270 B2 | 8/2010 | Nadimpalliraju et al. | |
| 8,368,330 B2* | 2/2013 | Baudesson | H02P 3/02 318/376 |
| 8,723,490 B2 | 5/2014 | Moussaoui et al. | |
| 8,797,773 B2 | 8/2014 | George | |
| 9,570,992 B2 | 2/2017 | Massolini et al. | |
| 9,711,962 B2 | 7/2017 | Andrea | |
| 9,748,848 B2 | 8/2017 | Bakran et al. | |
| 9,755,537 B2 | 9/2017 | Kolar et al. | |
| 9,853,565 B2 | 12/2017 | Yoscovich et al. | |
| 9,991,805 B2 | 6/2018 | Madsen et al. | |
| 10,020,747 B2 | 7/2018 | Madsen | |
| 10,181,798 B2 | 1/2019 | Kovacevic et al. | |
| 10,199,950 B1* | 2/2019 | Vinciarelli | H02M 3/33576 |
| 10,291,139 B2 | 5/2019 | Torrico-Bascop | |
| 10,340,805 B2 | 7/2019 | Kovacevic et al. | |
| 10,418,901 B2 | 9/2019 | Kovacevic et al. | |
| 10,492,070 B2 | 11/2019 | Stubblefield et al. | |
| 10,505,445 B2 | 12/2019 | Oh | |
| 2004/0213022 A1 | 10/2004 | Raddi et al. | |
| 2011/0103118 A1 | 5/2011 | Serpa et al. | |
| 2012/0281436 A1 | 11/2012 | Cuk | |
| 2015/0097546 A1 | 4/2015 | Pan et al. | |
| 2016/0065081 A1 | 3/2016 | Raju et al. | |
| 2016/0276941 A1* | 9/2016 | Iwaya | H02M 3/3376 |
| 2016/0315545 A1 | 10/2016 | Kovacevic et al. | |
| 2016/0322910 A1 | 11/2016 | Kovacevic et al. | |
| 2016/0359412 A1 | 12/2016 | Kovacevic et al. | |
| 2016/0365795 A1 | 12/2016 | Madsen et al. | |
| 2017/0019014 A1 | 1/2017 | Sagneri et al. | |
| 2017/0019031 A1 | 1/2017 | Sagneri et al. | |
| 2018/0109182 A1* | 4/2018 | Romanov | H02M 3/156 |
| 2018/0309368 A1 | 10/2018 | Sagneri et al. | |
| 2019/0116495 A1 | 4/2019 | Stubblefield et al. | |
| 2020/0083715 A1 | 3/2020 | Yoscovich et al. | |
| 2020/0092724 A1 | 3/2020 | Stubblefield et al. | |
| 2020/0153345 A1 | 5/2020 | Mnster et al. | |

FOREIGN PATENT DOCUMENTS

| | | |
|---|---|---|
| WO | 2010115452 A1 | 10/2010 |
| WO | 2011067120 A1 | 6/2011 |
| WO | 2019076874 A1 | 4/2019 |
| WO | 2020114758 A1 | 6/2020 |

OTHER PUBLICATIONS

Grain, Philip Adam et al.; Review of dc-dc converters for multi-terminal HVDC transmission networks; Feb. 2016; IET Power Electronics; vol. 9, No. 2; 20 pages.

Brown, Gerald M., HVDC Converters Review of Grain et al.; "Review of DC-DC Converters for Multi-Terminal HVDC Transmission Networks" in IET Power Electronics, p. 281-296, vol. 9, No. 2, 1755-4335; Jul. 18, 2021; 7 pages.

Isolated DC/DC-Converters; Whitepaper, vol. 1; Jan. 2012; RECOM Development & Trading GmbH & CoKG; 9 pages.

Kish, Gregory J. et al.; A Modular Multilevel DC/DC Converter With Fault Blocking Capability for HVDC Interconnects; IEEE Transactions on Power Electronics, vol. 30, No. 1, Jan. 2015; 15 pages.

Lin, Weixing et al.; Multiport DC-DC Autotransformer for Interconnecting Multiple High-Voltage DC Systems at Low Cost; IEEE Transactions on Power Electronics, vol. 30, No. 12, Dec. 2015; 13 pages.

Luth, T et al.; Modular Multilevel DC/DC converter architectures for HVDC taps; Jul. 7, 2020 (last modified); 10 pages.

Masood, Hajian et al.; 30kW, 200V/900V, thyristor LCL DC/DC converter laboratory prototype design and testing; 2013 Crown Copyright, IEEE; 9 pages.

Nami, Alireza et al.; Modular Multilevel Converters for HVDC Applications: Review on Converter Cells and Functionalities; IEEE Transactions on Power Electronics, vol. 30, No. 1, Jan. 2015; 19 pages.

Ozdemir, Saban et al.; Design and performance analysis of the three-level isolated DC-DC converter with the nanocrystalline core transformer; Elsevier, available online Mar. 18, 2017; 12 pages.

Stull, Ron; Isolated vs Non-Isolated Power Converters; Dec. 3, 2019; Cui Inc.; 11 pages.

Youtube video, "Isolated DC to DC Converter," uploaded by Chris's Workbench on Dec. 4, 2019; retrieved from https://m.youtube.com/watch?v=IYea9dxmOh4 on Sep. 9, 2020; 1 pg.

Flex; Technical Specification for BMR490 series Non-isolated DC-DC Converters Input 40-60 V, Output up to 139A / 1300 W; Apr. 2019; retrieved on Jul. 1, 2020 from https://flex.com/-/media/Project/Flex/BrandSite/technology/power/power_modules/Digital_DCDC/Flex-TS---BMR490_19-04-15.pdf; 71 pages.

Gowaid, I.A. et al.; Abstract of "A DC autotransformer design for medium and high voltage DC transmission systems"; Apr. 10-12, 2018; 2018 IEEE 12th International Conference on Compatibility, Power Electronics and Power Engineering; retrived on Jul. 1, 2020 from https://ieeexplore.ieee.org/abstract/document/8372549; 1 page.

Zhang, Junhong; Bidirectional DC-DC Power Converter Design Optimization, Modeling and Control; Dissertation submitted to faculty of Virginia Polytechnic Institute and State University; Jan. 30, 2008; retrieved on Jul. 1, 2020 from https://vtechworks.lib.vt.edu/bitstream/handle/10919/26126/Dissertation_jhz.pdf; 149 pages.

Ravi, Deepak et al.; Bidirectional dc to dc Converters: An Overview of Various Topologies, Switching Schemes and Control Techniques; 2018; International Journal of Engineering and Technology, vol. 7, No. 4.5; pp. 360-365.

* cited by examiner

DC-DC AUTO-CONVERTER MODULE

REFERENCE TO RELATED APPLICATION

This application claims priority of U.S. provisional patent application Ser. No. 63/063,800, entitled Systems, Methods and Apparatuses for Enhanced DC-DC Electrical Converters, filed Aug. 10, 2020, and hereby incorporates this provisional patent application by reference herein in its entirety.

TECHNICAL FIELD

Embodiments of the technology relate, in general, to systems, apparatuses and methods providing technical solutions for enhanced direct current to direct current (DC-DC) converters

BACKGROUND

DC-DC converters are widely used to efficiently produce a regulated voltage from a source that may or may not be well controlled to a load that may or may not be constant. A DC-to-DC converter is an electronic circuit or electromechanical device that converts DC voltage from one voltage level to another. Common topologies include buck and boost converters. A buck converter steps a voltage down, producing a voltage lower than the input voltage. A boost converter steps a voltage up, producing a voltage higher than the input voltage. DC-DC converters come in non-isolated and isolated varieties.

BRIEF DESCRIPTION OF THE DRAWINGS

It is believed that certain embodiments will be better understood from the following description taken in conjunction with the accompanying drawings in which.

DETAILED DESCRIPTION

Figure 1:
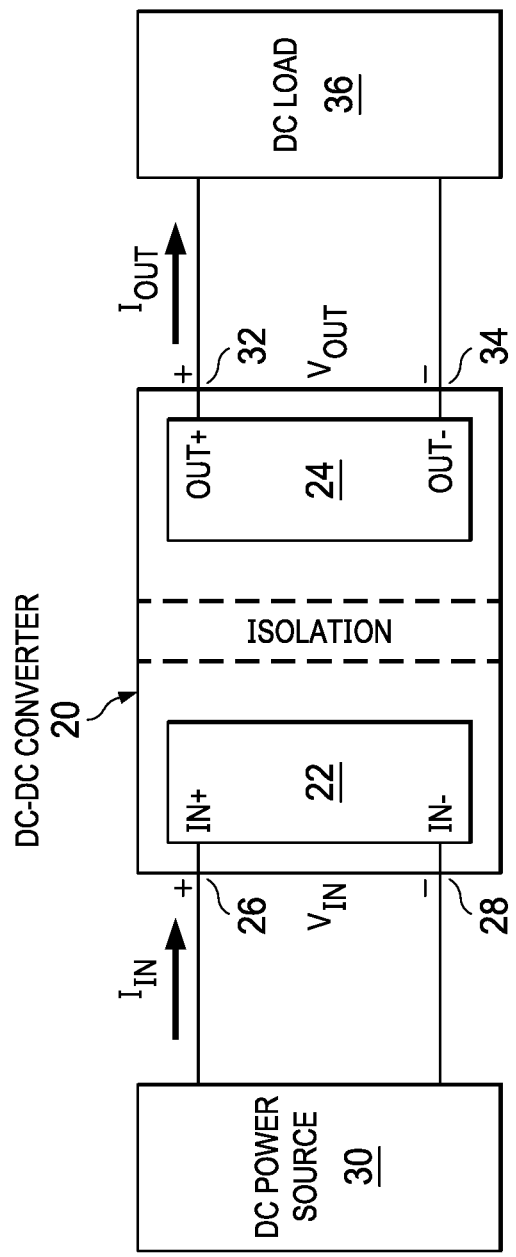
FIG. 1 is a schematic view depicting a conventional DC-DC converter associated with a DC power source and a DC load.

Various non-limiting embodiments of the present disclosure will now be described to provide an overall understanding of the principles of the structure, function, and use of the apparatuses, systems, methods, and processes disclosed herein. One or more examples of these non-limiting embodiments are illustrated in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment," or "in an embodiment" in places throughout the specification are not necessarily all referring to the same embodiment. Furthermore, the particular features, structures or characteristics may be combined in any suitable manner in one or more embodiments. In various embodiments disclosed herein, a single component can be replaced by multiple components and multiple components can be replaced by a single component to perform a given function or functions. Except where such substitution would not be operative, such substitution is within the intended scope of the embodiments.

The examples discussed herein are examples only and are provided to assist in the explanation of the apparatuses, devices, systems and methods described herein. None of the features or components shown in the drawings or discussed below should be taken as mandatory for any specific implementation of any of these the apparatuses, devices, systems or methods unless specifically designated as mandatory. For ease of reading and clarity, certain components, modules, or methods may be described solely in connection with a specific figure. Any failure to specifically describe a combination or sub-combination of components should not be understood as an indication that any combination or sub-combination is not possible. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Technical solutions to enhance the operating capabilities of DC-DC converters can be achieved by the systems, apparatuses and methods of the present disclosure. The disclosed systems, apparatuses and methods achieve improvements to base DC-DC converters to have greatly increased efficiency and power capability.

In general, the disclosed systems, apparatuses and methods enable base DC-DC converters (referred to herein as "base modules"), including state-of-the-art DC-DC converters, to be installed in configurations, referred to herein as "auto-connections," that can greatly increase efficiency and power capability, or reduce cost, size, weight, and/or footprint for the same power level. The apparatus disclosed is referred to herein as an "auto-converter," and the systems and methods relate to auto-converter technology. Disclosed is a representative family of auto-converter configurations applicable to DC-DC converters that enhance their operating capabilities. Of the various configurations identified in the disclosure, some result in improved efficiency and increase the power throughput by, for example, as much as an order of magnitude. Other configurations have a more modest impact on efficiency and power rating but can be useful in applications where large voltage ratios are required.

Auto-converter technology can incorporate existing or custom-built base modules. In one embodiment, the auto-converter can be a retrofit or aftermarket technology that allows a commercial-off-the-shelf (COTS) isolated DC-DC converter to be reconfigured by means of galvanically connecting certain terminals together to form a non-isolated DC-DC converter with increased efficiency and power capability. The technology can also encompass new design paradigms and tools to facilitate the repurposing of existing DC-DC products for solutions with higher power and efficiency, and/or with lower cost. The auto-converter and its associated engineering tools constitute a unique after-market product that can be employed across the entire field of power electronics.

The examples discussed herein are examples only and are provided to assist in the explanation of the apparatuses, devices, systems and methods described herein. None of the features or components shown in the drawings or discussed below should be taken as mandatory for any specific implementation of any of these the apparatuses, devices, systems or methods unless specifically designated as mandatory. For ease of reading and clarity, certain components, modules, or methods may be described solely in connection with a specific figure. Any failure to specifically describe a combination or sub-combination of components should not be understood as an indication that any combination or sub-combination is not possible. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Embodiments are hereinafter described in detail in connection with the views and examples of FIGS. 1-17, wherein like numbers indicate the same or corresponding elements throughout the views. FIG. 1 illustrates a conventional isolated DC-DC converter 20 that includes an input circuit 22 and an output circuit 24 that are galvanically isolated from each other. It is to be appreciated that input and output circuits described as being galvanically isolated from each other can be understood to mean that there is no direct current (DC) electrical conduction path provided between the input and output terminals such that no DC electric current is conducted between the input and output terminals during normal (e.g., non-fault) operation of the isolated DC-DC converter.

The input circuit 22 can include positive input terminal 26 and a negative input terminal 28 that are electrically coupled to a DC power source 30. The output circuit 24 can include a positive output terminal 32 and a negative output terminal 34 that are electrically coupled with a DC load 36. The DC power source 30 can be configured to provide DC input power $S_{in}$ to the conventional isolated DC-DC converter 20 in the form of an input current $I_{in}$ through the input circuit 22 and an input voltage $V_{in}$ across the positive and negative input terminals 26, 28. The conventional isolated DC-DC converter 20 can be configured to convert the DC input power $S_{in}$ into DC output power $S_b$ that is delivered to the DC load 36 in the form of an output current $I_{out}$ through the output circuit 24 and an output voltage $V_{out}$ across the positive and negative output terminals 32, 34.

The input circuit 22 and the output circuit 24 can have a voltage ratio n that describes the operation of the conventional isolated DC-DC converter 20 and the output voltage $V_{out}$ that is provided across the across the positive and negative output terminals 32, 34. The DC-DC converter can have a voltage gain $G_v$ (defined as $V_{out}/V_{in}$), a current gain $G_i$ (defined as $I_{out}/I_{in}$), and an efficiency $\eta_b$ (defined as $S_b/S_{in}$). The voltage gain $G_v$ and the current gain $G_i$ can be dependent on the voltage ratio n. Under ideal circumstances, the efficiency $\eta_b$ of the conventional isolated DC-DC converter 20 is 100%. However, in reality, the conventional isolated DC-DC converter 20 is subject to internal losses such that the efficiency ηb is less than 100%, and is typically between 85% and 95%.

In one embodiment, the voltage ratio of the DC-DC converter can be n:1, where n is greater than 1 such that the conventional isolated DC-DC converter 20 is considered a "step-down" converter. In such an embodiment, the voltage gain $G_v$ is equal to 1/n and the ideal current gain is equal to n. In another embodiment, the voltage ratio of the DC-DC converter can be 1:n, where n is greater than 1 such that the conventional isolated DC-DC converter 20 is considered a "step-up" converter. In such an embodiment, the voltage gain $G_v$ is equal to n and the ideal current gain is equal to 1/n. It is to be appreciated that the input current $I_{in}$ is shown to flow into the conventional isolated DC-DC converter 20 and the output current $I_{out}$ is shown to flow out of the conventional isolated DC-DC converter 20. The conventional isolated DC-DC converter 20 can accordingly be configured as a "forward" converter. However, if the input and output currents $I_{in}$, $I_{out}$ were to flow in the opposite direction (e.g., with the output current $I_{out}$ flowing into the conventional isolated DC-DC converter 20 and the input current $I_{in}$ flowing out of the conventional isolated DC-DC converter 20), the conventional isolated DC-DC converter 20 can instead be configured as a "reverse" converter. In some embodiments, the isolated DC-DC converter can be configured as a reverse converter by installing a forward converter backwards.

The conventional isolated DC-DC converter 20 can utilize any conventional topology, including but not limited to circuits utilizing resonant operation, ZVS, ZCS, and SAC. The input current $I_{in}$ and the output current $I_{out}$ of the DC-DC converter 20 can be considered to be DC, with minimal harmonic content. That is, any filter elements that may be utilized to stabilize the operation of the DC-DC converter 20 (e.g., according to a manufacturer's specifications) can be understood to be incorporated into the input circuit 22 and the output circuit 24 and are thus not illustrated in FIG. 1.

In other embodiments, the DC-DC converter 20 can be configured to conduct current in both forward and reverse directions, resulting in a bidirectional DC-DC converter. In some embodiments, the DC power source 30 and the DC load 36 can be configured to supply and absorb power, respectively. In other embodiments the load can be regenerative and the DC power source 30 and the DC load 36 can absorb and supply power, respectively.

Figure 2:
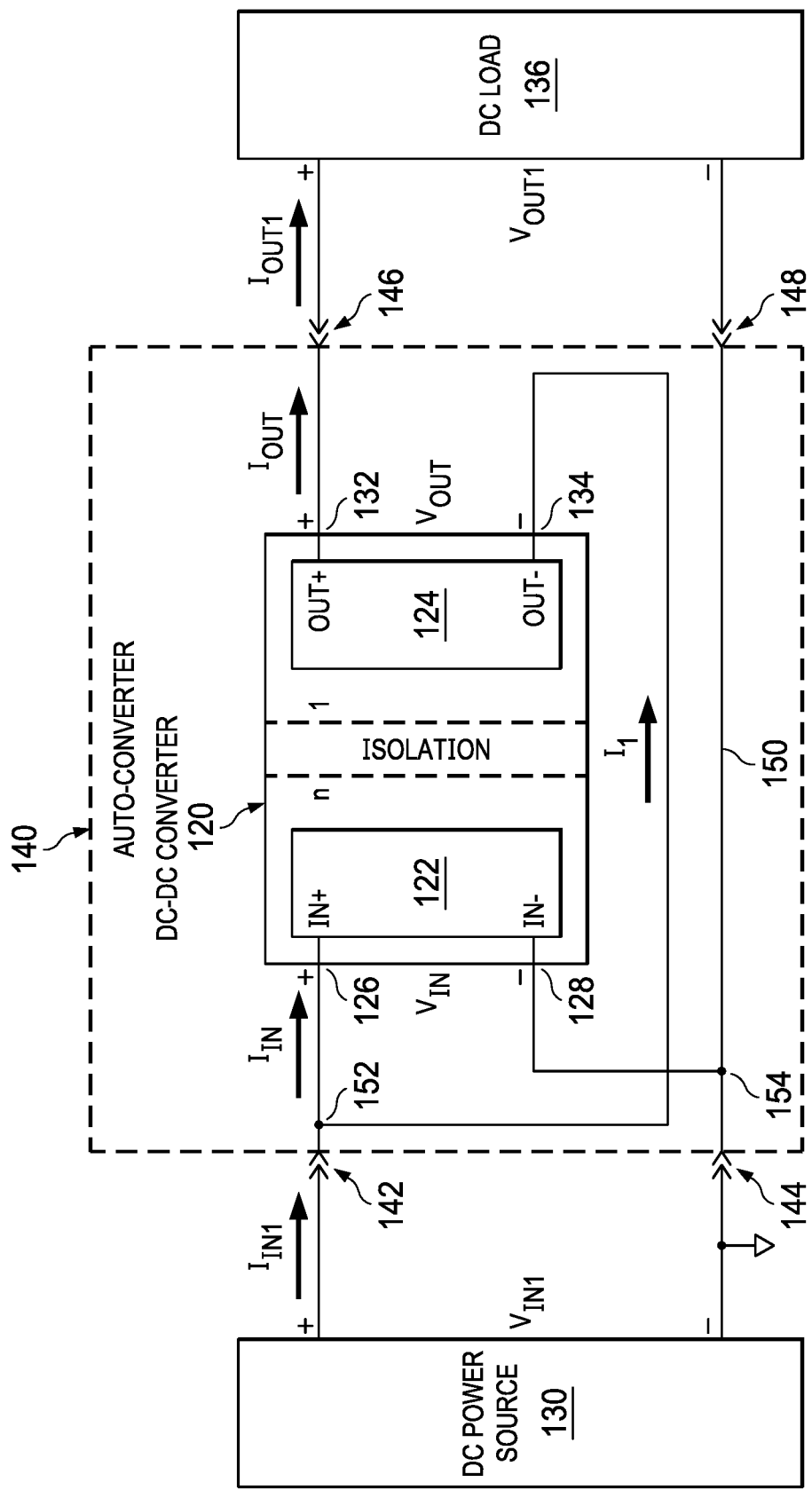
FIG. 2 is a schematic view depicting a DC-DC auto-converter module, in accordance with one embodiment.

FIG. 2 illustrates one embodiment of a DC-DC auto-converter module 140 (hereinafter auto-converter 140) that includes an isolated DC-DC converter 120 is the same as the isolated DC-DC converter illustrated in FIG. 1 and is configured as a step down converter (i.e., with a voltage ratio of n:1). For example, the isolated DC-DC converter 120 can include input circuit 122 and output circuit 124. The input circuit 122 can include a positive input terminal 126 and a negative input terminal 128. The output circuit 124 can include a positive output terminal 132 and a negative output terminal 134. An input current $I_{in}$ can be present at the positive input terminal 126 and an output current $I_{out}$ can be present at the positive output terminal 132.

The auto-converter 140 can be electrically coupled with a DC power source 130 and a DC load 136. The auto-converter 140 can include a positive source terminal 142 and a negative source terminal 144 that cooperate with each other to facilitate connection of the DC power source 130 to the auto-converter 140. The auto-converter 140 can include a positive load terminal 146 and a negative load terminal 148 that cooperate with each other to facilitate connection of the DC load 136 to the auto-converter 140. The negative source terminal 144 and the negative load terminal 148 can be galvanically connected together via a ground bus 150 that provides an electrical ground for the auto-converter 140. It is to be appreciated that components described as being galvanically connected together can be understood to have a DC resistance that is low enough such that the voltage drop across the galvanic connection when the auto-converter is operating at rated DC current is reasonably small (e.g., less than 2% of the rated input or output voltage, whichever is smaller). For low power auto-converters (e.g., less than 10 W), this value could be less than 100 mΩ. For high power auto-converters (e.g., greater than 10 kW), or auto-converters with very high current ratings (e.g., 400 A), the DC resistance could be less than 10 mΩ. Suitable resistance values can be established by anyone skilled in the art. The galvanic connections are described herein in terms of their DC impedance, but it is to be appreciated that the galvanic connections can also be understood to have an AC impedance that is also low enough such that any AC harmonics present at the galvanic connection do not adversely affect the performance of the auto-converter.

The DC power source 130 can be configured to provide DC input power $S_{in1}$ to the isolated DC-DC converter 120 in the form of an input current $I_{in1}$ that flows into the positive source terminal 142 at an input voltage $V_{in1}$ provided across the positive and negative source terminals 142, 144. The auto-converter 140 can be configured to convert the DC input power $S_{in1}$ into DC output power $S_{a1}$ that is delivered to the DC load 136 in the form of an output current $I_{out1}$ that flows out of the positive load terminal 146 at an output voltage $V_{out1}$ provided across the positive and negative load terminals 146, 148. It is to be appreciated that the DC power source 130 can be any of variety of suitable DC power sources that are configured to generate DC power, such as, for example, a DC motor, a battery, a photovoltaic cell, or an AC/DC converter. It is also to be appreciated that the DC load 136 can be any of a variety of loads that are capable of receiving DC power, such as, for example, a DC motor, a rechargeable DC battery, a light bulb, or a DC/AC converter.

The auto-converter 140 can have a voltage gain $G_{v1}$ (defined as $V_{out1}/V_{in1}$), a current gain $G_{i1}$ (defined as $I_{out1}/I_{in1}$), a power gain $G_{a1}$ (defined as $S_{a1}/S_b$), and an efficiency rating $\eta_{a1}$ (defined as $S_{a1}/S_{in1}$). The power gain $G_{a1}$ can be understood to be distinct from the efficiency $\eta_{a1}$. While the efficiency $\eta_b$ of the DC/DC converter 120 is always less than 1, the power gain $G_{a1}$ can be significantly larger than unity. The efficiency rating $\eta_{a1}$ of the auto-converter 140 can accordingly exceed the efficiency $\eta_b$ of the DC/DC converter 120 which can enable the efficiency of the auto-converter 140 to approach unity more effectively than the DC/DC converter 120.

The positive source terminal 142, the negative source terminal 144, the positive load terminal 146, and the negative load terminal 148 (collectively "terminals") can allow for easy connection of the DC power source 130 and the DC load 136 to the auto-converter 140. As such, the auto-converter 140 can be readily employed in any of a variety of electrical applications that utilize a DC-DC converter. In one embodiment, each of the terminals 142, 144, 146, 148 can comprise terminal blocks (not shown) that are configured to allow for electrical connection to the auto-converter 140 with screws or other similar releasable fasteners. It is to be appreciated that the terminals 142, 144, 146, 148 can include be any of a variety of suitable alternative releasable electrical connection arrangements, such as, for example, a plug, or any of a variety of suitable non-releasable electrical connection arrangements, such as a soldering terminal or a pin that is provided through a printed circuit board. Terminals 144 and 148 can also be the same terminal, making the auto-converter a 3-terminal device.

The isolated DC-DC converter 120 can be wired together and to the terminals 142, 144, 146, 148 within the auto-converter 140 in a configuration that is different from the conventional arrangement illustrated in FIG. 1 and that enhances the performance of the auto-converter 140 over conventional converter topologies. Still referring to FIG. 2, the positive input terminal 126 of the isolated DC-DC converter 120 can be galvanically connected to the positive source terminal 142 at location 152. The negative input terminal 128 of the isolated DC-DC converter 120 can be galvanically connected to the ground bus 150 at location 154. The positive output terminal 132 of the isolated DC-DC converter 120 can be galvanically connected the positive load terminal 146. The negative output terminal 134 of the isolated DC-DC converter 120 can be galvanically connected to the positive input terminal 126 such that the positive input terminal 126, the negative output terminal 134, and the positive source terminal 142 are all galvanically connected together. During operation, a current $I_1$ can be generated that flows into the negative output terminal 134 such that the currents are added on the high voltage side of the isolated DC-DC converter which can be beneficial for the overall power throughput and efficiency of the auto-converter 140. It is to be appreciated that these galvanic connections have sufficiently low impedance to DC currents that they don't introduce significant losses. On the contrary, the galvanic connections can allow the rated losses of the auto-converter 140 to effectively be the same as the rated losses of the isolated DC-DC converter 120 even while the auto-converter has significantly higher power throughput. This can lead to a dramatic improvement in efficiency.

By wiring the isolated DC-DC converter 120 in this manner, the auto-converter 140 can have the performance characteristics listed in Table 1 listed as a function of n.

TABLE 1

| Voltage Gain $G_{v1}$ | $\dfrac{n+1}{n}$ |
|---|---|
| Current Gain $G_{i1}$ | $\left(\dfrac{n}{n+\dfrac{1}{\eta_b}}\right)$ |
| Power Gain $G_{a1}$ | $n+1$ |
| Efficiency Rating $\eta_{a1}$ | $\left(\dfrac{n+1}{n+\dfrac{1}{\eta_b}}\right)$ |

When the output voltage $V_{out}$ of the isolated DC-DC converter 120 is 1 VDC, the performance characteristics listed in Table 2 can be achieved as a function of n.

TABLE 2

| Input Voltage $V_{in}$ | n |
|---|---|
| Input Voltage $V_{in1}$ | n |
| Output Voltage $V_{out1}$ | n + 1 |
| Input current $I_{in1}$ | $\dfrac{(n+1)}{\eta_b}$ |
| Input current $I_{in}$ | $\dfrac{1}{\eta_b}$ |
| Output current $I_{out1}$ | n |
| Output current $I_{out}$ | n |
| Current $I_1$ | n |

The auto-converter 140 can have a larger power gain $G_{a1}$, higher efficiency $\eta_{a1}$, and smaller voltage gain $G_{v1}$ than the conventional isolated DC-DC converter 20 illustrated in FIG. 1. As the value of n increases the power gain $G_{a1}$ increases, the efficiency $\eta_{a1}$ approaches unity, and the voltage gain $G_{v1}$ approaches unity. The efficiency $\eta_{a1}$ can dramatically increase for larger n values. The auto-converter 140 can effectively be a small boost positive converter. The auto-converter 140 can provide higher power throughput and better efficiency than conventional topologies and can be smaller, more lightweight, and less expensive. This can especially be true for larger n values (e.g., n≥6).

Figure 3:
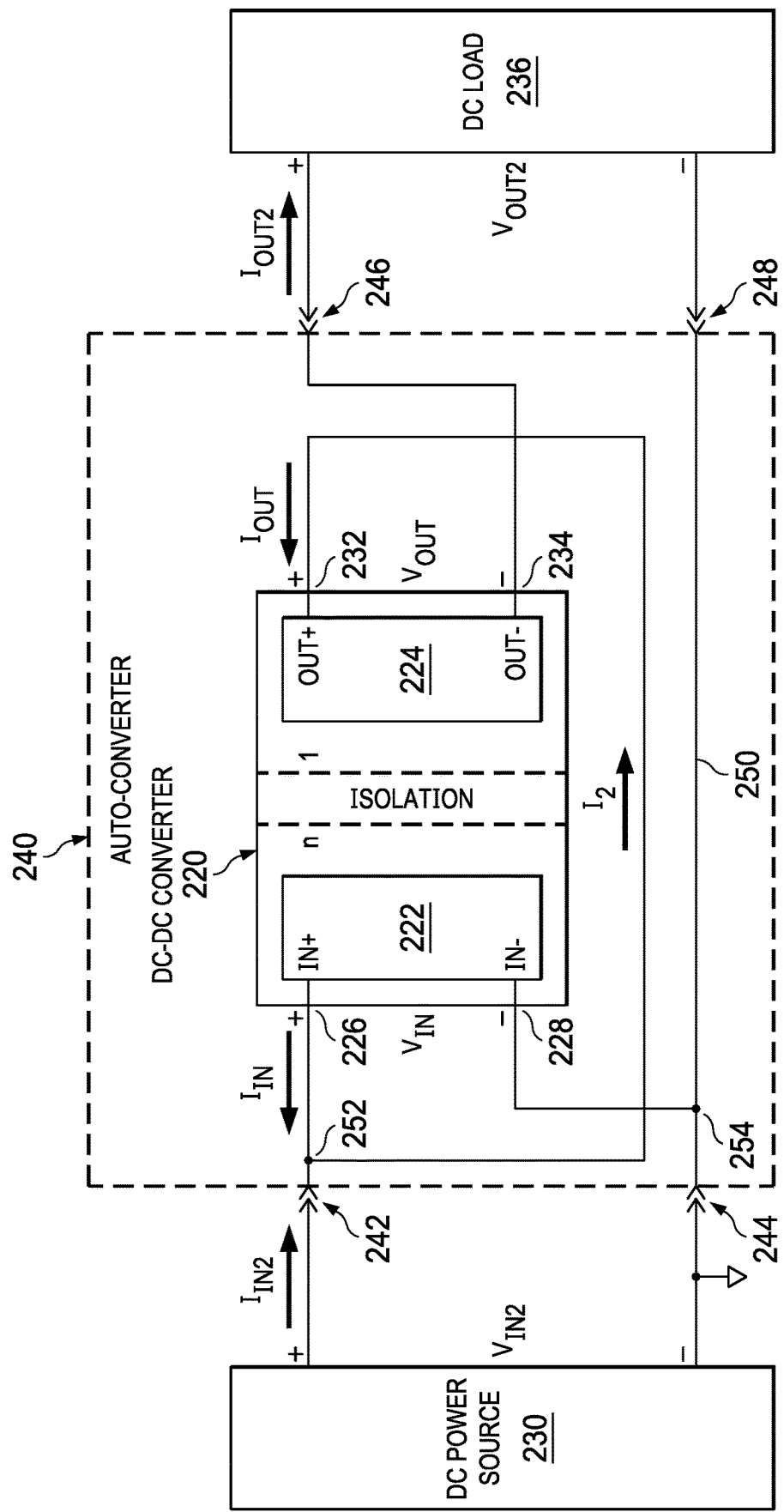
FIG. 3 is a schematic view depicting a DC-DC auto-converter module, in accordance with another embodiment.

FIG. 3 illustrates an alternative embodiment of an auto-converter 240 that is similar to, or the same in many respects as, the auto-converter 140 of FIG. 2. For example, the auto-converter 240 can include an isolated DC-DC converter 220 that includes an input circuit 222 and an output circuit 224 that has a voltage ratio of n:1. The input circuit 222 can include a positive input terminal 226 and a negative input terminal 228. The output circuit 224 can include a positive output terminal 232 and a negative output terminal 234. An input current $I_{in}$ can be present at the positive input terminal 226 and an output current $I_{out}$ can be present at the positive output terminal 232. The auto-converter 240 can include a positive source terminal 242, a negative source terminal 244, a positive load terminal 246, a negative load terminal 248, and a ground bus 250. A DC power source 230 can provide DC input power $S_{in2}$ to the auto-converter 240 in the form of an input current $I_{in2}$ at the positive source terminal 242 at an input voltage $V_{in2}$ provided across the positive and negative source terminals 242, 244.

DC output power $S_{a2}$ can be delivered to a DC load 236 in the form of an output current $I_{out2}$ at the positive load terminal 246 at an output voltage $V_{out2}$ provided across the positive and negative load terminals 246, 248. The auto-converter 240 can have a voltage gain $G_{v2}$ (defined as $V_{out2}/V_{in2}$), a current gain $G_{i2}$ (defined as $I_{out2}/I_{in2}$), a power gain $G_{a2}$ (defined as $S_{a2}/S_b$), and an efficiency rating $\eta_{a1}$ ($S_{a2}/S_{in}$) which ideally is unity but, in reality, is less than unity.

Similar to the auto-converter 140, the negative input terminal 228 of the isolated DC-DC converter 220 can be galvanically connected to the ground bus 250 at location 254. However, the positive output terminal 232 of the isolated DC-DC converter 220 can be galvanically connected to the positive input terminal 226 at location 252 such that the positive input terminal 226, the positive output terminal 232, and the positive source terminal 242 are all galvanically connected together. The negative output terminal 234 of the isolated DC-DC converter 120 can be galvanically connected to the positive load terminal 246. A current $I_2$ can flow into the positive output terminal 232 such that the currents are added on the high voltage side of the isolated DC-DC converter 220.

By wiring the isolated DC-DC converter 220 in this manner, the auto-converter 240 can have the performance characteristics listed in Table 3 listed as a function of n.

TABLE 3

| Voltage Gain $G_{v2}$ | $\dfrac{n-1}{n}$ |
|---|---|
| Current Gain $G_{i2}$ | $\dfrac{n}{n-\eta_b}$ |
| Power Gain $G_{a2}$ | n − 1 |
| Efficiency Rating $\eta_{a2}$ | $\dfrac{n-1}{n-\eta_b}$ |

When the output voltage $V_{out}$ of the isolated DC-DC converter 220 is 1 VDC, the performance characteristics listed in Table 4 can be achieved as a function of n.

TABLE 4

| Input Voltage $V_{in}$ | n |
|---|---|
| Input Voltage $V_{in2}$ | n |
| Output Voltage $V_{out2}$ | n − 1 |
| Input current $I_{in2}$ | n − $\eta_b$ |
| Input current $I_{in}$ | $\eta_b$ |
| Output current $I_{out2}$ | n |
| Output current $I_{out}$ | n |
| Current $I_2$ | n |

The auto-converter 240 can have a larger power gain $G_{a2}$, higher efficiency $\eta_{a2}$, and smaller voltage gain $G_{v2}$ than the conventional isolated DC-DC converter 20 illustrated in FIG. 1. As the value of n increases the power gain $G_{a1}$ increases, the efficiency $\eta_{a2}$ approaches unity, and the voltage gain $G_{v2}$ approaches unity. The efficiency $\eta_{a2}$ can dramatically increase for larger n values. The auto-converter 240 can effectively be a small buck negative converter and because the input and output currents $I_{in}$ and $I_{out}$ flow in reverse (e.g., with the output current $I_{out}$ flowing into the isolated DC-DC converter 220 and the input current $I_{in}$ flowing out of the isolated DC-DC converter 220), the isolated DC-DC converter 220 can instead be configured as a reverse converter. The auto-converter 240 can provide higher power throughput and better efficiency than conventional topologies and can be smaller, more lightweight, and less expensive.

Figure 4:
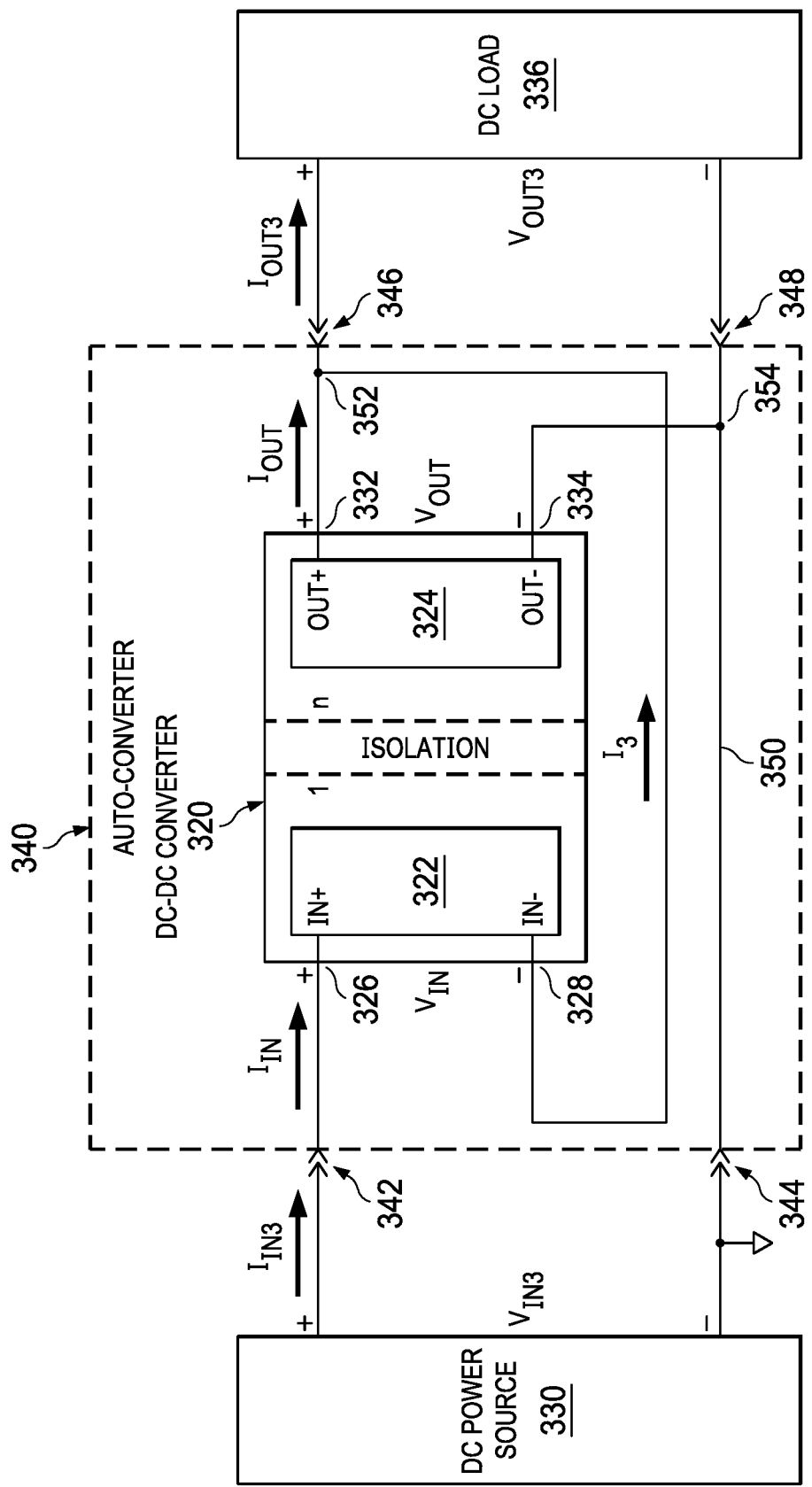
FIG. 4 is a schematic view depicting a DC-DC auto-converter module, in accordance with another embodiment.

FIG. 4 illustrates an alternative embodiment of an auto-converter 340 that is similar to, or the same in many respects as, the auto-converter 140 of FIG. 2. For example, the auto-converter 340 can include an isolated DC-DC converter 320 that includes an input circuit 322 and an output circuit 324. The input circuit 322 can include a positive input terminal 326 and a negative input terminal 328. The output circuit 324 can include a positive output terminal 332 and a negative output terminal 334. An input current $I_{in}$ can be present at the positive input terminal 326 and an output current $I_{out}$ can be present at the positive output terminal 332. The auto-converter 340 can include a positive source terminal 342, a negative source terminal 344, a positive load terminal 346, a negative load terminal 348, and a ground bus 350. A DC power source 330 can provide DC input power $S_{in3}$ to the auto-converter 340 in the form of an input current $I_{in3}$ at the positive source terminal 342 at an input voltage $V_{in3}$ provided across the positive and negative source terminals 342, 344.

DC output power $S_{a3}$ can be delivered to a DC load 336 in the form of an output current $I_{out3}$ at the positive load terminal 346 at an output voltage $V_{out3}$ provided across the positive and negative load terminals 346, 348. The auto-converter 340 can have a voltage gain $G_{v3}$ (defined as $V_{out3}/V_{in3}$), a current gain $G_{i3}$ (defined as $I_{out3}/I_{in3}$), a power gain $G_{a3}$ (defined as $S_{a3}/S_b$), and an efficiency rating $\eta_{a3}$ ($S_{a3}/S_{in3}$) which ideally is unity but, in reality, is less than unity.

The auto-converter 340 can be different from the auto-converter 140 in that the input circuit 322 and the output circuit 324 has a voltage ratio of 1:n. In addition, the negative output terminal 334 of the isolated DC-DC converter 320 can be galvanically connected to the ground bus 350 at location 354. The negative input terminal 328 of the isolated DC-DC converter 320 can be galvanically connected to the positive output terminal 332 such that the negative input terminal 328, the positive output terminal 332, and the positive load terminal 346 are all galvanically connected together at location 352. A current $I_3$ can flow out of the negative input terminal 328 such that the currents are added on the high voltage side of the isolated DC-DC converter 320 which can be beneficial for the overall power throughput and efficiency of the auto-converter 340. It is to be appreciated that these galvanic connections can allow the rated losses of the auto-converter 340 to effectively be the same as the isolated DC-DC converter 320.

By wiring the isolated DC-DC converter 320 in this manner, the auto-converter 340 can have the performance characteristics listed in Table 5 listed as a function of n.

TABLE 5

| Voltage Gain $G_{v3}$ | $\dfrac{n}{n+1}$ |
|---|---|

TABLE 5-continued

| Current Gain $G_{i3}$ | $1 + \dfrac{\eta_b}{n}$ |
|---|---|
| Power Gain $G_{p3}$ | $\dfrac{n}{\eta_b} + 1$ |
| Efficiency Rating $\eta_{a3}$ | $\dfrac{n + \dfrac{1}{\eta_b}}{n+1}$ |

When the output voltage yin of the isolated DC-DC converter 320 is 1 VDC, the performance characteristics listed in Table 6 can be achieved as a function of n.

TABLE 6

| Output Voltage $V_{out}$ | n |
|---|---|
| Input Voltage $V_{in3}$ | n + 1 |
| Output Voltage $V_{out3}$ | n |
| Input current $I_{in3}$ | $\dfrac{n}{\eta_b}$ |
| Input current $I_{in}$ | $\dfrac{n}{\eta_b}$ |
| Output current $I_{out3}$ | $\dfrac{n}{\eta_b} + 1$ |
| Output current $I_{out}$ | 1 |
| Current $I_3$ | $\dfrac{n}{\eta_b}$ |

The auto-converter 340 can have a larger power gain $G_{a3}$, higher efficiency $\eta_{a3}$, and smaller voltage gain $G_{v3}$ than the conventional isolated DC-DC converter 20 illustrated in FIG. 1. As the value of n increases the power gain $G_{a1}$ increases, the efficiency $\eta_{a3}$ approaches unity, and the voltage gain $G_{v3}$ approaches unity. The efficiency $\eta_{a3}$ can dramatically increase for larger n values. The auto-converter 340 can effectively be a small buck positive converter.

Figure 5:
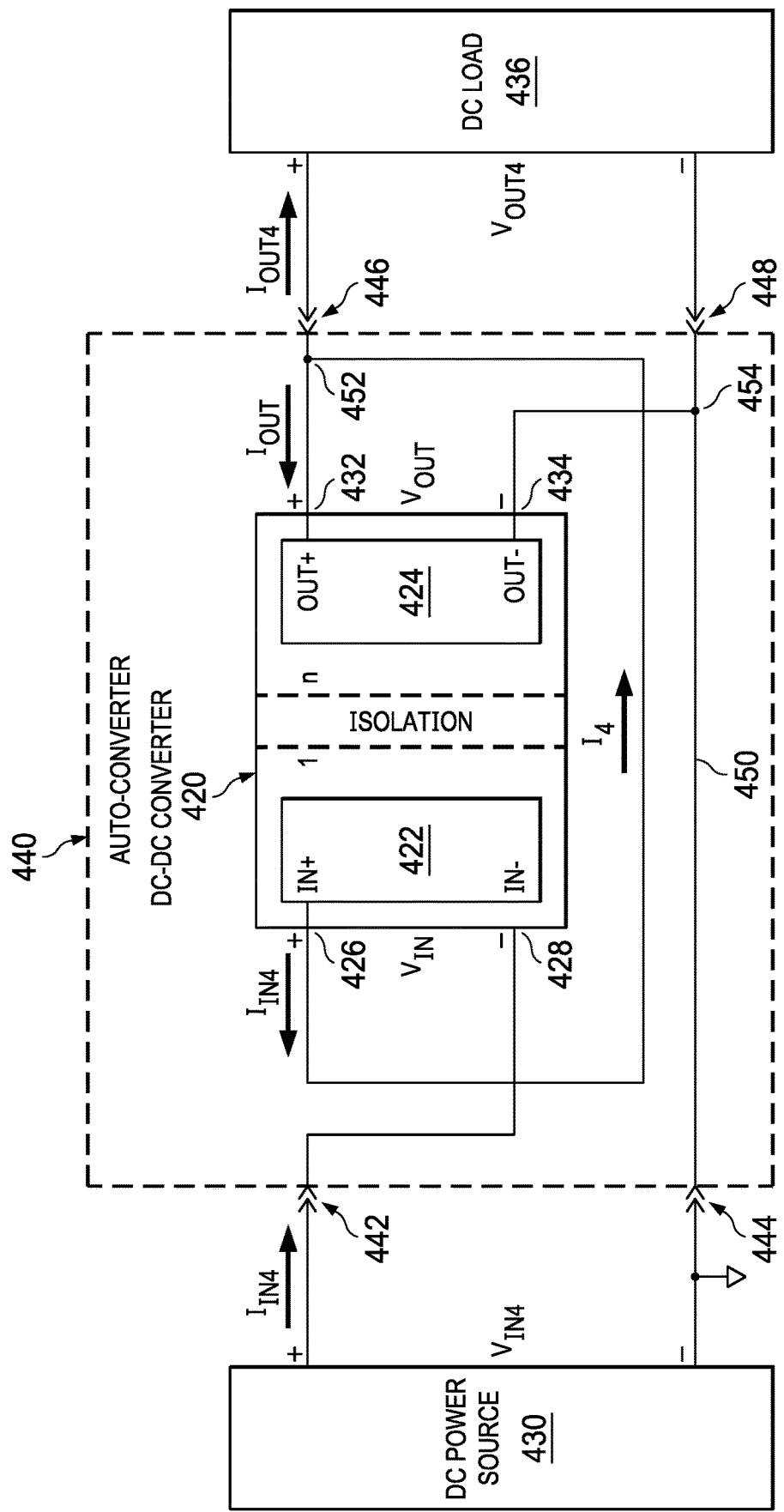
FIG. 5 is a schematic view depicting a DC-DC auto-converter module, in accordance with yet another embodiment.

FIG. 5 illustrates an alternative embodiment of an auto-converter 440 that is similar to, or the same in many respects as, the auto-converter 140 of FIG. 2. For example, the auto-converter 440 can include an isolated DC-DC converter 420 that includes an input circuit 422 and an output circuit 424 that has a voltage ratio of 1:n. The input circuit 422 can include a positive input terminal 426 and a negative input terminal 428. The output circuit 424 can include a positive output terminal 432 and a negative output terminal 434. An input current $I_{in}$ can be present at the positive input terminal 426 and an output current $I_{out}$ can be present at the positive output terminal 432. The auto-converter 440 can include a positive source terminal 442, a negative source terminal 444, a positive load terminal 446, a negative load terminal 448, and a ground bus 450. A DC power source 430 can provide DC input power $S_{in4}$ to the auto-converter 440 in the form of an input current $I_{in4}$ at the positive source terminal 442 at an input voltage $V_{in4}$ provided across the positive and negative source terminals 442, 444.

DC output power $S_{a4}$ can be delivered to a DC load 436 in the form of an output current $I_{out4}$ at the positive load terminal 446 at an output voltage $V_{out4}$ provided across the positive and negative load terminals 446, 448. The auto-converter 440 can have a voltage gain $G_{v4}$ (defined as $V_{out4}/V_{in4}$), a current gain $G_{i4}$ (defined as $I_{out4}/I_{in4}$), a power gain $G_{a4}$ (defined as $S_{a4}/S_b$), and an efficiency rating $\eta_{a4}$ ($S_{a4}/S_{in4}$) which ideally is unity but, in reality, is less than unity.

The auto-converter 440 can be different from the auto-converter 140 in that the input circuit 422 and the output circuit 424 has a voltage ratio of 1:n. In addition, the positive source terminal 442 can be galvanically coupled with the negative input terminal 428. The negative output terminal 434 of the isolated DC-DC converter 420 can be galvanically connected to the ground bus 450 at location 454. The positive input terminal 426 of the isolated DC-DC converter 420 can be galvanically connected to the positive output terminal 432 such that the positive input terminal 426, the positive output terminal 432, and the positive load terminal 446 are all galvanically connected together at location 452. A current $I_4$ can flow out of the positive input terminal 426 such that the currents are added on the high voltage side of the isolated DC-DC converter 420.

By wiring the isolated DC-DC converter 420 in this manner, the auto-converter 440 can have the performance characteristics listed in Table 7 listed as a function of n.

TABLE 7

| | |
|---|---|
| Voltage Gain $G_{v4}$ | $\dfrac{n}{n-1}$ |
| Current Gain $G_{i4}$ | $\dfrac{1}{n - \dfrac{\eta_b}{n}}$ |
| Power Gain $G_{a4}$ | $n * \eta_b - 1$ |
| Efficiency Rating $\eta_{a4}$ | $\dfrac{1}{n - \dfrac{\eta_b}{n-1}}$ |

When the output voltage $V_{in}$ of the isolated DC-DC converter 420 is n VDC, the performance characteristics listed in Table 8 can be achieved as a function of n.

TABLE 8

| | |
|---|---|
| Outpu Voltage $V_{out}$ | n |
| Input Voltage $V_{in4}$ | n − 1 |
| Output Voltage $V_{out4}$ | n |
| Input current $I_{in4}$ | $n * \eta_b$ |
| Input current $I_{in}$ | $n * \eta_b$ |
| Output current $I_{out4}$ | $n * \eta_b - 1$ |
| Output current $I_{out}$ | 1 |
| Current $I_4$ | $n * \eta_b$ |

The auto-converter 440 can have a larger power gain $G_{a4}$, higher efficiency $\eta_{a4}$, and smaller voltage gain $G_{v4}$ than the conventional isolated DC-DC converter 20 illustrated in FIG. 1. As the value of n increases the power gain $G_{a1}$ increases, the efficiency $\eta_{a4}$ approaches unity, and the voltage gain $G_{v4}$ approaches unity. The efficiency $\eta_{a4}$ can dramatically increase for larger n values. The auto-converter 440 can effectively be a small boost negative converter and because the output current $I_{out}$ flows into the isolated DC-DC converter 420 and the input current $I_{in}$, flows out of the isolated DC-DC converter 420, the isolated DC-DC converter 420 can instead be configured as a reverse converter.

Figure 6:
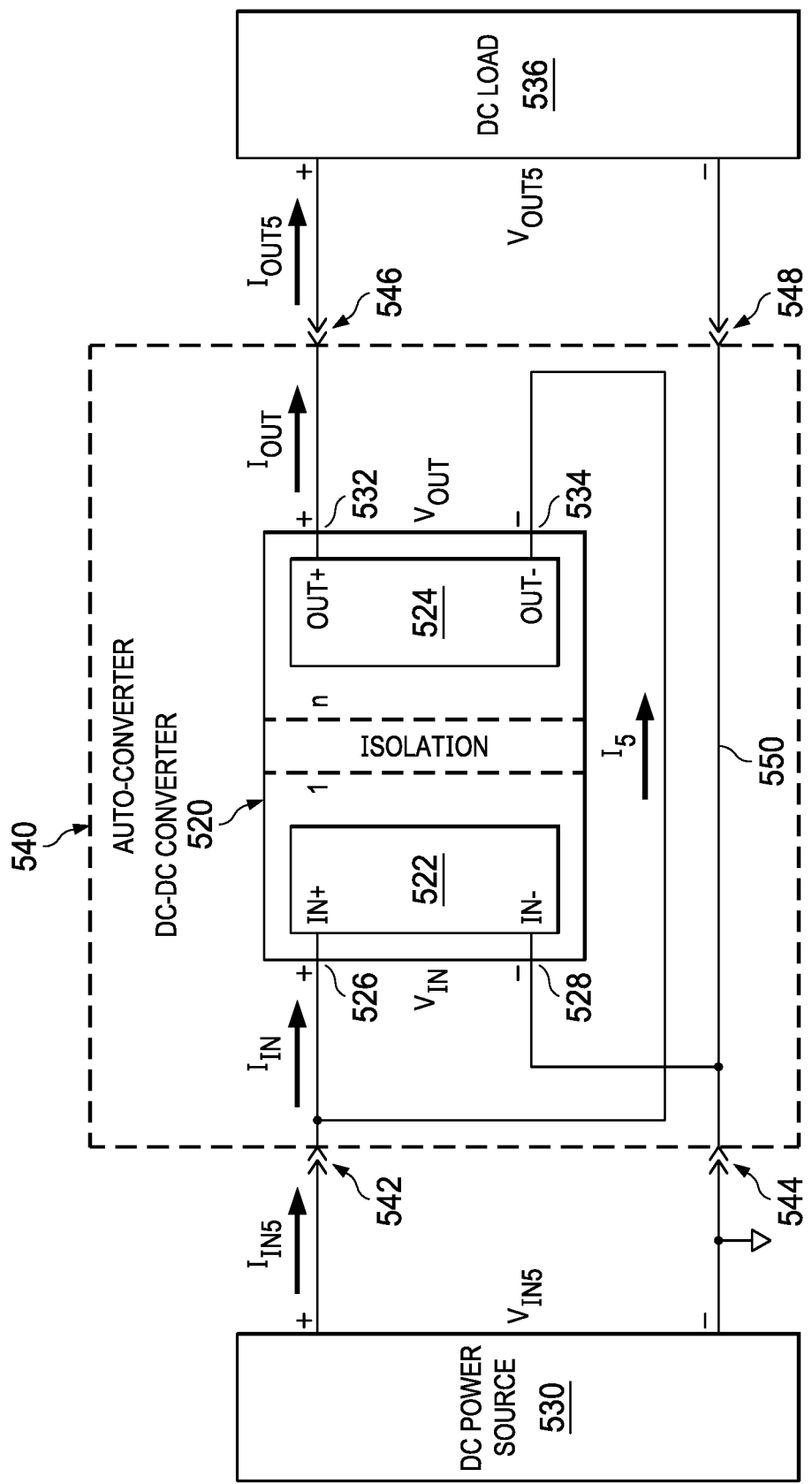
FIG. 6 is a schematic view depicting a DC-DC auto-converter module, in accordance with yet another embodiment.

FIG. 6 illustrates an alternative embodiment of an auto-converter 540 that is similar to, or the same in many respects as, the auto-converter 140 of FIG. 2. For example, the auto-converter 540 can include an isolated DC-DC converter 520 that includes an input circuit 522 and an output circuit 524. The input circuit 522 can include a positive input terminal 526 and a negative input terminal 528. The output circuit 524 can include a positive output terminal 532 and a negative output terminal 534. An input current $I_{in}$ can be present at the positive input terminal 526 and an output current $I_{out}$ can be present at the positive output terminal 532. The auto-converter 540 can include a positive source terminal 542, a negative source terminal 544, a positive load terminal 546, a negative load terminal 548, and a ground bus 550. A DC power source 530 can provide DC input power $S_{in5}$ to the auto-converter 540 in the form of an input current $I_{in5}$ at the positive source terminal 542 at an input voltage $V_{in5}$ provided across the positive and negative source terminals 542, 544. During operation, a current $I_5$ can be generated.

DC output power $S_{a5}$ can be delivered to a DC load 536 in the form of an output current $I_{out5}$ at the positive load terminal 546 at an output voltage $V_{out5}$ provided across the positive and negative load terminals 546, 548. The auto-converter 540 can have a voltage gain $G_{v5}$ (defined as $V_{out5}/V_{in5}$), a current gain $G_{i5}$ (defined as $I_{out5}/I_{in5}$), a power gain $G_{a5}$ (defined as $S_{a5}/S_b$), and an efficiency rating $\eta_{a5}$ ($S_{a5}/S_{in5}$) which ideally is unity but, in reality, is less than unity. The auto-converter 540 can be different from the auto-converter 140 in that the input circuit 522 and the output circuit 524 has a voltage ratio of 1:n.

By wiring the isolated DC-DC converter 520 in this manner, the auto-converter 540 can have the performance characteristics listed in Table 9 listed as a function of n.

TABLE 9

| | |
|---|---|
| Voltage Gain $G_{v5}$ | n + 1 |
| Current Gain $G_{i5}$ | $\dfrac{1}{\dfrac{n}{\eta_b} + 1}$ |
| Power Gain $G_{a5}$ | $\dfrac{n+1}{n}$ |
| Efficiency Rating $\eta_{a5}$ | $\dfrac{n+1}{\dfrac{n}{\eta_b} + 1}$ |

When the input voltage $V_{in}$ of the isolated DC-DC converter 520 is 1 VDC, the performance characteristics listed in Table 10 can be achieved as a function of n.

TABLE 10

| | |
|---|---|
| Output Voltage $V_{out}$ | n |
| Input Voltage $V_{in5}$ | 1 |
| Output Voltage $V_{out5}$ | n + 1 |
| Input current $I_{in5}$ | $\dfrac{n}{\eta_b} + 1$ |
| Input current $I_{in}$ | $\dfrac{n}{\eta_b}$ |
| Output current $I_{out5}$ | 1 |
| Output current $I_{out}$ | 1 |
| Current $I_5$ | 1 |

The auto-converter 540 can have a smaller power gain $G_{a5}$ (e.g., closer to unity) and an efficiency $\eta_{a5}$ that approaches the efficiency $\eta_b$ of the isolated DC-DC converter 520 than the conventional isolated DC-DC converter 20 illustrated in FIG. 1. As the value of n increases, the power gain $G_{a5}$ decreases (e.g., towards unity) and the efficiency $\eta_{a5}$ of the auto-converter 540 approaches the efficiency $\eta_b$ of the isolated DC-DC converter 520.

Figure 7:
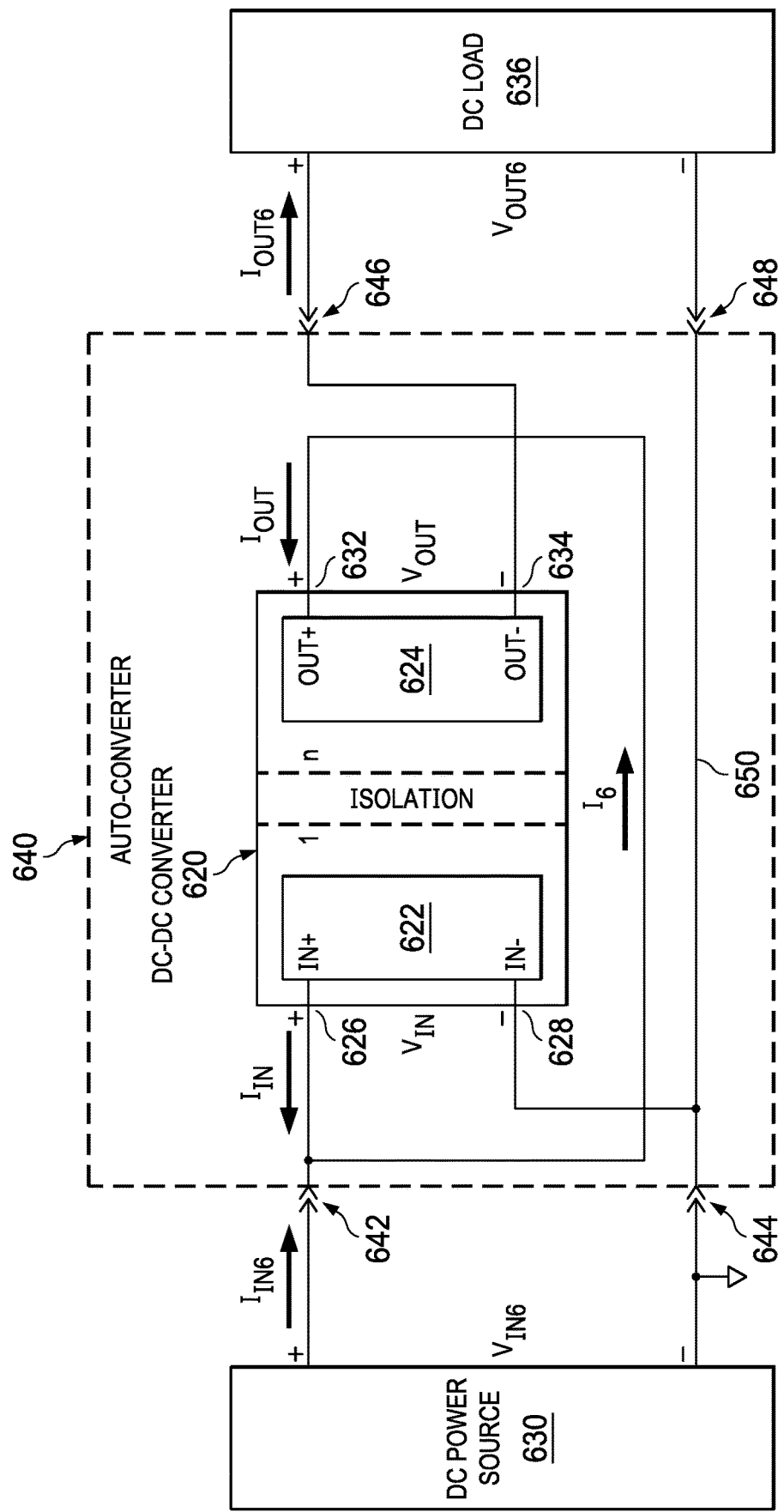
FIG. 7 is a schematic view depicting a DC-DC auto-converter module, in accordance with yet another embodiment.

FIG. 7 illustrates an alternative embodiment of an auto-converter 640 that is similar to, or the same in many respects as, the auto-converter 240 of FIG. 3. For example, the auto-converter 640 can include an isolated DC-DC converter 620 that includes an input circuit 622 and an output circuit 624. The input circuit 622 can include a positive input terminal 626 and a negative input terminal 628. The output circuit 624 can include a positive output terminal 632 and a negative output terminal 634. An input current $I_{in}$ can be present at the positive input terminal 626 and an output current $I_{out}$ can be present at the positive output terminal 632. The auto-converter 640 can include a positive source terminal 642, a negative source terminal 644, a positive load terminal 646, a negative load terminal 648, and a ground bus 650. A DC power source 630 can provide DC input power $S_{in6}$ to the auto-converter 640 in the form of an input current $I_{in6}$ at the positive source terminal 642 at an input voltage $V_{in6}$ provided across the positive and negative source terminals 642, 644. During operation, a current $I_6$ can be generated.

DC output power $S_{a6}$ can be delivered to a DC load 636 in the form of an output current $I_{out6}$ at the positive load terminal 646 at an output voltage $V_{out6}$ provided across the positive and negative load terminals 646, 648. The auto-converter 640 can have a voltage gain $G_{v6}$ (defined as $V_{out6}/V_{in6}$), a current gain $G_{i6}$ (defined as $I_{out6}/I_{in6}$), a power gain $G_{a6}$ (defined as $S_{a6}/S_b$), and an efficiency rating $\eta_{a6}$ ($S_{a6}/S_{in}$) which ideally is unity but, in reality, is less than unity. The auto-converter 640 can be different from the auto-converter 240 in that the input circuit 622 and the output circuit 624 has a voltage ratio of 1:n.

By wiring the isolated DC-DC converter 620 in this manner, the auto-converter 640 can have the performance characteristics listed in Table 11 listed as a function of n.

TABLE 11

| | |
|---|---|
| Voltage Gain $G_{v6}$ | $-(n-1)$ |
| Current Gain $G_{i6}$ | $-\dfrac{1}{n*\eta_b - 1}$ |
| Power Gain $G_{a6}$ | $\dfrac{-(n-1)}{n}$ |
| Efficiency Rating $\eta_{a6}$ | $\dfrac{n*\eta_b - 1}{n-1}$ |

When the input voltage $V_{in}$ of the isolated DC-DC converter 620 is 1 VDC, the performance characteristics listed in Table 12 can be achieved as a function of n.

TABLE 12

| | |
|---|---|
| Output Voltage $V_{out}$ | n |
| Input Voltage $V_{in6}$ | 1 |
| Output Voltage $V_{out6}$ | $-(n-1)$ |
| Input current $I_{in6}$ | $-(n*\eta_b - 1)$ |
| Input current $I_{in}$ | $n*\eta_b$ |

TABLE 12-continued

| | |
|---|---|
| Output current $I_{out6}$ | 1 |
| Output current $I_{out}$ | 1 |
| Current $I_6$ | 1 |

The auto-converter 640 can have a smaller power gain $G_{a6}$ (e.g., closer to unity) and an efficiency $\eta_{a6}$ that approaches the efficiency $\eta_b$ of the isolated DC-DC converter 620 than the conventional isolated DC-DC converter 20 illustrated in FIG. 1. As the value of n increases, the power gain $G_{a6}$ decreases (e.g., towards unity) and the efficiency nab of the auto-converter 640 approaches the efficiency $\eta_b$ of the isolated DC-DC converter 620.

Figure 8:
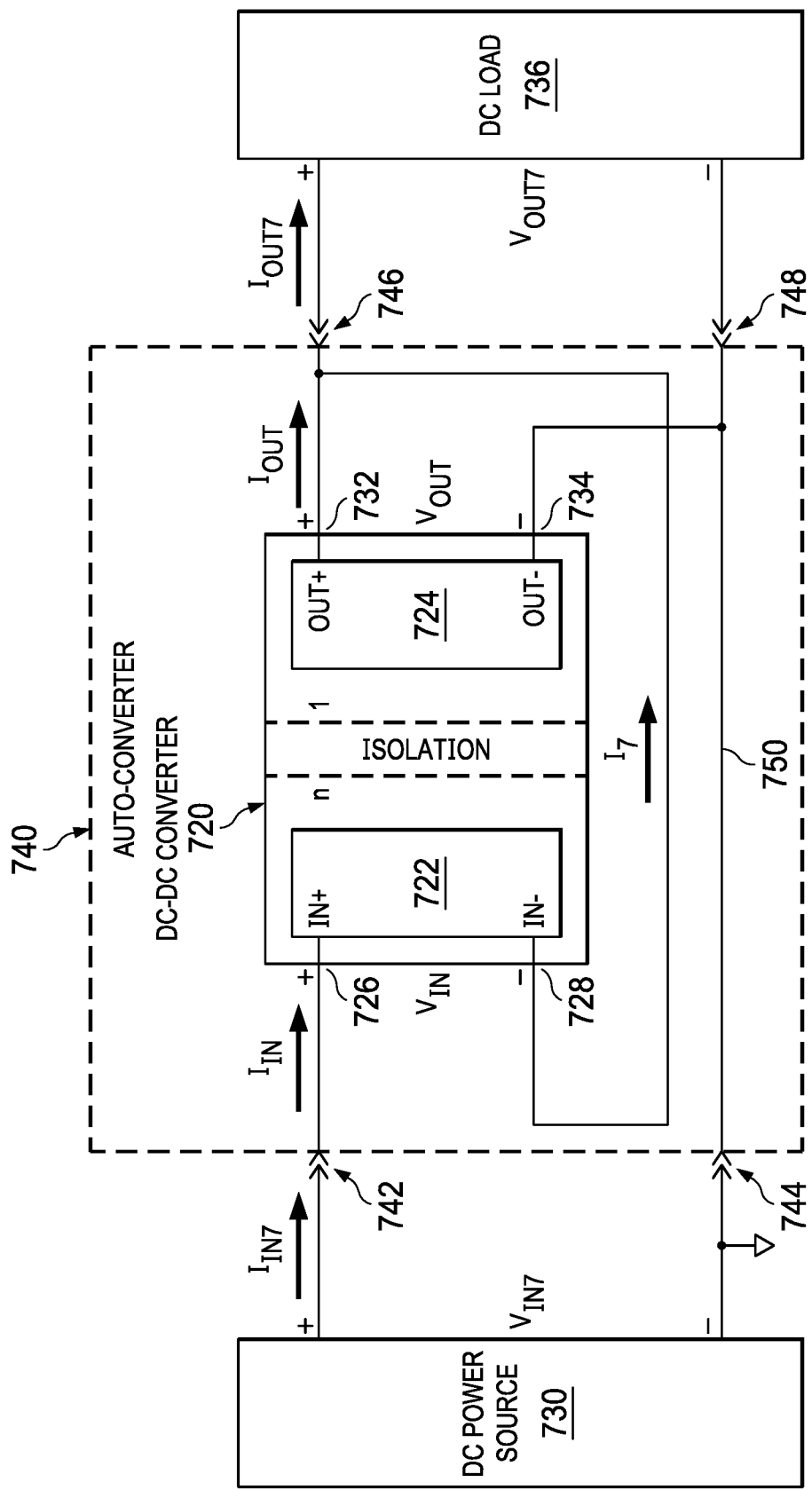
FIG. 8 is a schematic view depicting a DC-DC auto-converter module, in accordance with yet another embodiment.

FIG. 8 illustrates an alternative embodiment of an auto-converter 740 that is similar to, or the same in many respects as, the auto-converter 340 of FIG. 4. For example, the auto-converter 740 can include an isolated DC-DC converter 720 that includes an input circuit 722 and an output circuit 724. The input circuit 722 can include a positive input terminal 726 and a negative input terminal 728. The output circuit 724 can include a positive output terminal 732 and a negative output terminal 734. An input current $I_{in}$ can be present at the positive input terminal 726 and an output current $I_{out}$ can be present at the positive output terminal 732. The auto-converter 740 can include a positive source terminal 742, a negative source terminal 744, a positive load terminal 746, a negative load terminal 748, and a ground bus 750. A DC power source 730 can provide DC input power $S_{in7}$ to the auto-converter 740 in the form of an input current $I_{in7}$ at the positive source terminal 742 at an input voltage $V_{in7}$ provided across the positive and negative source terminals 742, 744. During operation, a current $I_7$ can be generated.

DC output power $S_{a7}$ can be delivered to a DC load 736 in the form of an output current $I_{out7}$ at the positive load terminal 746 at an output voltage $V_{out7}$ provided across the positive and negative load terminals 746, 748. The auto-converter 740 can have a voltage gain $G_{v7}$ (defined as $V_{out7}/V_{in7}$), a current gain $G_{i7}$ (defined as $I_{out7}/I_{in7}$), a power gain $G_{a7}$ (defined as $S_{a7}/S_b$), and an efficiency rating $\eta_{a7}$ ($S_{a7}/S_{in7}$) which ideally is unity but, in reality, is less than unity. The auto-converter 740 can be different from the auto-converter 340 in that the input circuit 722 and the output circuit 724 has a voltage ratio of n:1.

By wiring the isolated DC-DC converter 720 in this manner, the auto-converter 740 can have the performance characteristics listed in Table 13 listed as a function of n.

TABLE 13

| | |
|---|---|
| Voltage Gain $G_{v7}$ | $\dfrac{1}{(n+1)}$ |
| Current Gain $G_{i7}$ | $n*\eta_b + 1$ |
| PowerGain $G_{a7}$ | $1 + \dfrac{1}{n*\eta_b}$ |
| Efficiency Rating $\eta_{a7}$ | $\dfrac{n*\eta_b + 1}{n+1}$ |

When the output voltage $V_{out}$ of the isolated DC-DC converter 720 is 1 VDC, the performance characteristics listed in Table 14 can be achieved as a function of n.

TABLE 14

| | |
|---|---|
| Input Voltage $V_{in}$ | n |
| Input Voltage $V_{in7}$ | n + 1 |
| Output Voltage $V_{out7}$ | 1 |
| Input current $I_{in7}$ | $\frac{1}{\eta_b}$ |
| Input current $I_{in}$ | $\frac{1}{\eta_b}$ |
| Output current $I_{out7}$ | $n + \frac{1}{\eta_b}$ |
| Output current $I_{out}$ | n |
| Current $I_7$ | $\frac{1}{\eta_b}$ |

The auto-converter 740 can have a smaller power gain $G_{a7}$ (e.g., closer to unity) and an efficiency $\eta_{a7}$ that approaches the efficiency $\eta_b$ of the isolated DC-DC converter 720 than the conventional isolated DC-DC converter 20 illustrated in FIG. 1. As the value of n increases, the power gain $G_{a7}$ decreases (e.g., towards unity) and the efficiency $\eta_{a7}$ of the auto-converter 740 approaches the efficiency $\eta_b$ of the isolated DC-DC converter 720.

Figure 9:
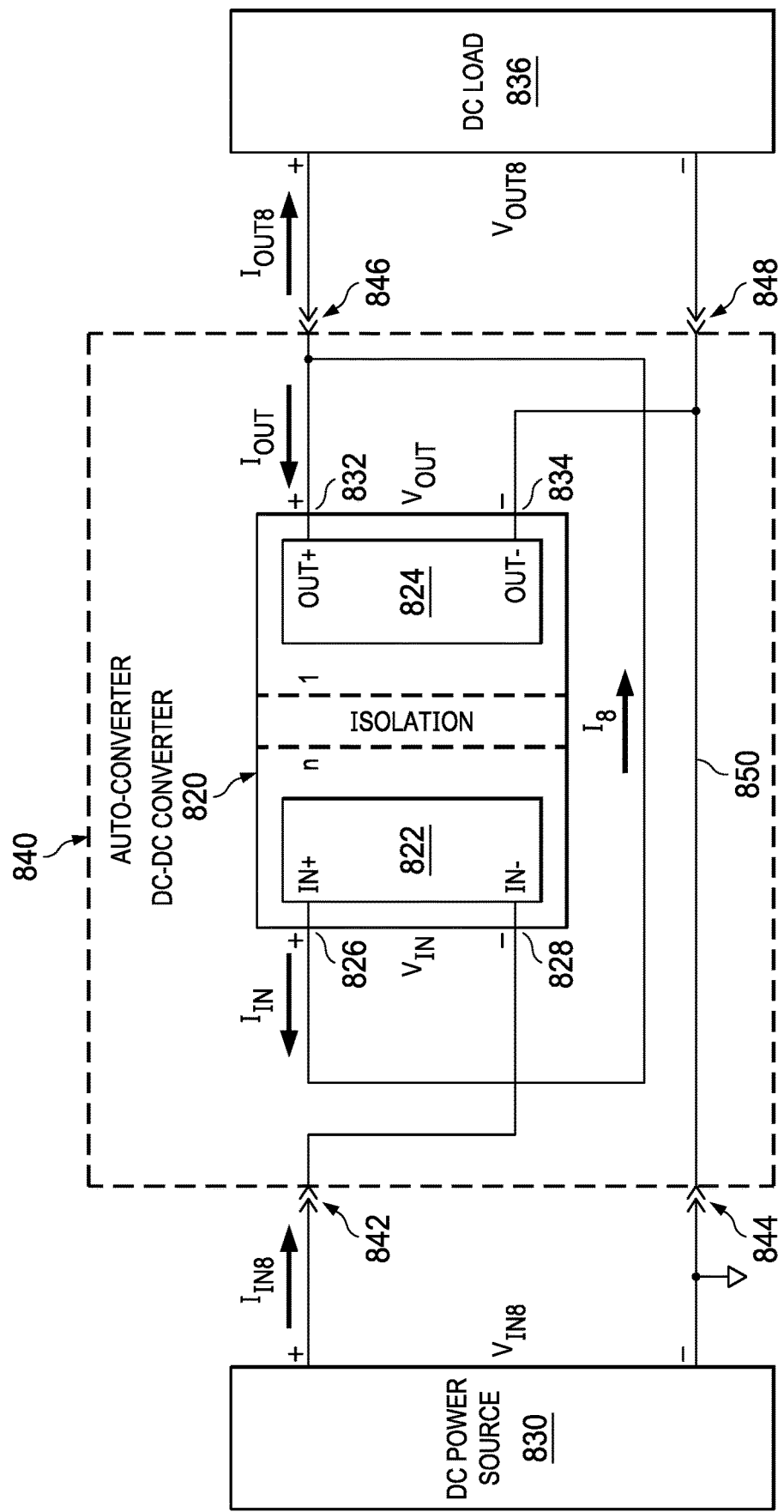
FIG. 9 is a schematic view depicting a DC-DC auto-converter module, in accordance with yet another embodiment.

FIG. 9 illustrates an alternative embodiment of an auto-converter 840 that is similar to, or the same in many respects as, the auto-converter 440 of FIG. 5. For example, the auto-converter 840 can include an isolated DC-DC converter 820 that includes an input circuit 822 and an output circuit 824. The input circuit 822 can include a positive input terminal 826 and a negative input terminal 828. The output circuit 824 can include a positive output terminal 832 and a negative output terminal 834. An input current $I_{in}$ can be present at the positive input terminal 826 and an output current $I_{out}$ can be present at the positive output terminal 832. The auto-converter 840 can include a positive source terminal 842, a negative source terminal 844, a positive load terminal 846, a negative load terminal 848, and a ground bus 850. A DC power source 830 can provide DC input power $S_{in8}$ to the auto-converter 840 in the form of an input current $I_{in8}$ at the positive source terminal 842 at an input voltage $V_{in8}$ provided across the positive and negative source terminals 842, 844. During operation, a current $I_8$ can be generated.

DC output power $S_{a8}$ can be delivered to a DC load 836 in the form of an output current $I_{out8}$ at the positive load terminal 846 at an output voltage $V_{out8}$ provided across the positive and negative load terminals 846, 848. The auto-converter 840 can have a voltage gain $G_{v8}$ (defined as $V_{out8}/V_{in8}$), a current gain $G_{i8}$ (defined as $I_{out8}/I_{in8}$), a power gain $G_{a8}$ (defined as $S_{a8}/S_b$), and an efficiency rating nag ($S_{a8}/S_{in8}$) which ideally is unity but, in reality, is less than unity. The auto-converter 840 can be different from the auto-converter 440 in that the input circuit 822 and the output circuit 824 has a voltage ratio of n:1.

By wiring the isolated DC-DC converter 820 in this manner, the auto-converter 840 can have the performance characteristics listed in Table 15 listed as a function of n.

TABLE 15

| | |
|---|---|
| Voltage Gain $G_{v8}$ | $\frac{-1}{(n-1)}$ |
| Current Gain $G_{i8}$ | $\frac{-(n - \eta_b)}{\eta_b}$ |
| Power Gain $G_{a8}$ | $\frac{-(n - \eta_b)}{n}$ |
| Efficiency Rating $\eta_{a8}$ | $\frac{n - 1}{n/\eta_b - 1}$ |

When the output voltage $V_{out}$ of the isolated DC-DC converter 820 is 1 VDC, the performance characteristics listed in Table 16 can be achieved as a function of n.

TABLE 16

| | |
|---|---|
| Input Voltage $V_{in}$ | n |
| Input Voltage $V_{in8}$ | -(n - 1) |
| Output Voltage $V_{out8}$ | 1 |
| Input current $I_{in8}$ | $\eta_b$ |
| Input current $I_{in}$ | $\eta_b$ |
| Output current $I_{out8}$ | $-(n - \eta_b)$ |
| Output current $I_{out}$ | n |
| Current $I_8$ | $\eta_b$ |

The auto-converter 840 can have a smaller power gain $G_{a8}$ (e.g., closer to unity) and an efficiency $\eta_{a8}$ that approaches the efficiency $\eta_b$ of the isolated DC-DC converter 820 than the conventional isolated DC-DC converter 20 illustrated in FIG. 1. As the value of n increases, the power gain $G_{a8}$ decreases (e.g., towards unity) and the efficiency nag of the auto-converter 840 approaches the efficiency $\eta_b$ of the isolated DC-DC converter 820.

Figure 10:
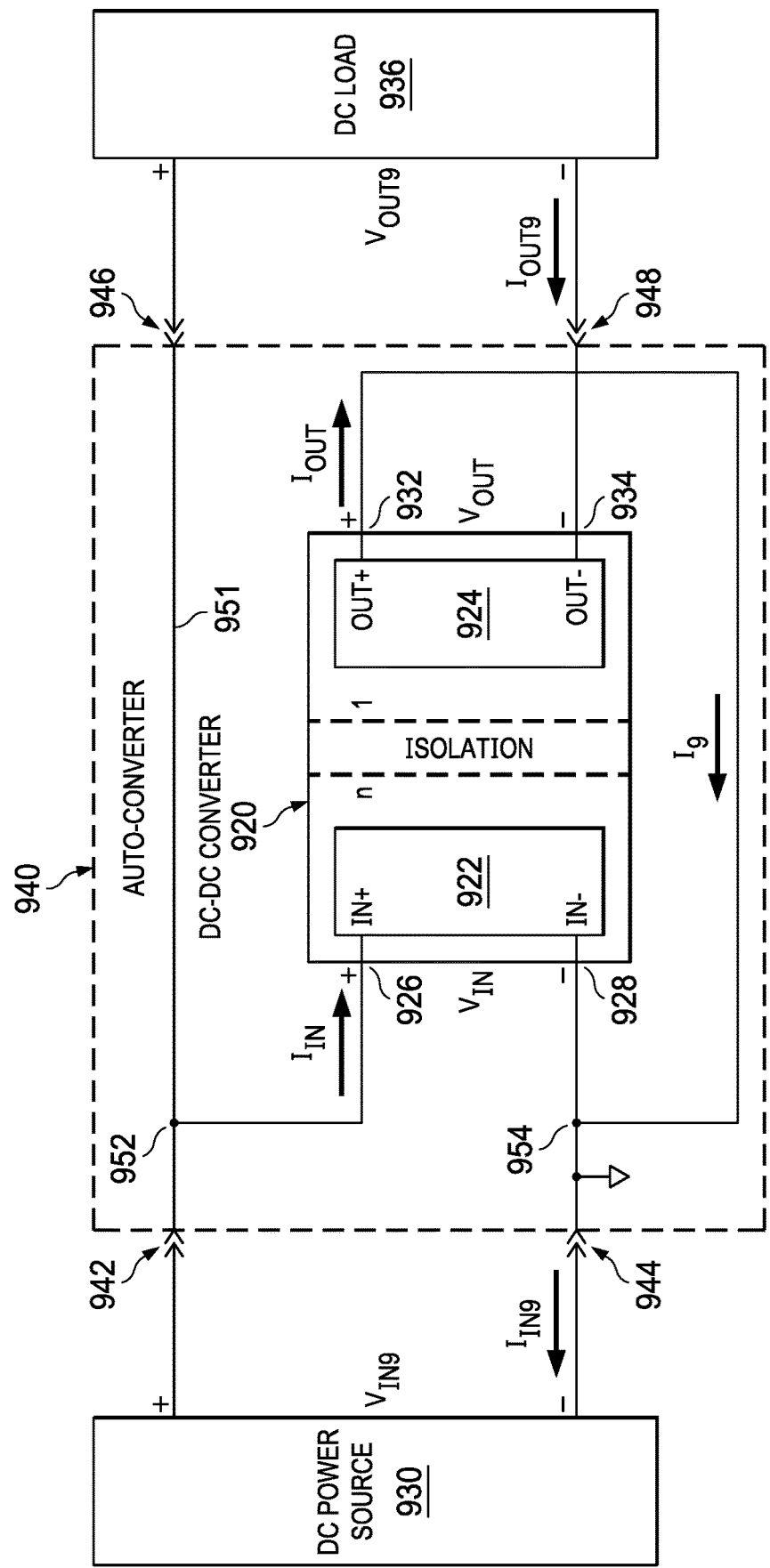
FIG. 10 is a schematic view depicting a DC-DC auto-converter module, in accordance with yet another embodiment.

FIG. 10 illustrates an alternative embodiment of an auto-converter 940 that is similar to, or the same in many respects as, the auto-converter 140 of FIG. 2. For example, the auto-converter 940 can include an isolated DC-DC converter 920 that includes an input circuit 922 and an output circuit 924 that has a voltage ratio of n:1. The input circuit 922 can include a positive input terminal 926 and a negative input terminal 928. The output circuit 924 can include a positive output terminal 932 and a negative output terminal 934. The auto-converter 940 can include a positive source terminal 942, a negative source terminal 944, a positive load terminal 946, and a negative load terminal 948. The negative source terminal 944 can provide an electrical ground for the auto-converter 940.

A DC power source 930 can provide DC input power $S_{in9}$ to the auto-converter 940 in the form of an input current $I_{in9}$ at the negative source terminal 944 at an input voltage $V_{in9}$ provided across the positive and negative source terminals 942, 944. The input current $I_{in9}$ can flow out of the negative source terminal 944 and towards the DC power source 930. DC output power $S_{a9}$ can be delivered to a DC load 936 in the form of an output current $I_{out9}$ at the negative load terminal 948 at an output voltage $V_{out9}$ provided across the positive and negative load terminals 946, 948. The output current $I_{out9}$ can flow out of the DC load 936 and towards the negative load terminal 948. The auto-converter 940 can have a voltage gain $G_{v9}$ (defined as $V_{out9}/V_{in9}$), a current gain $G_{i9}$ (defined as $I_{out9}/I_{in9}$), a power gain $G_{a9}$ (defined as $S_{a9}/S_b$), and an efficiency rating $\eta_{a9}$ ($S_{a9}/S_{in9}$) which ideally is unity but, in reality, is less than unity.

The auto-converter 940 can be different from the auto-converter 140 in that the auto-converter 940 can include a main bus 951 that is galvanically connected to the positive source terminal 942 and the positive load terminal 946. The positive input terminal 926 of the isolated DC-DC converter 920 can be galvanically connected to the main bus 951 at location 952. The negative input terminal 928 of the isolated DC-DC converter 920 can be galvanically connected to the negative source terminal 944. The positive output terminal 932 of the isolated DC-DC converter 920 can be galvanically connected to the negative input terminal 928 such that the negative input terminal 928, the positive output terminal 932, and the negative source terminal 944 are galvanically connected together at location 954. The negative output terminal 934 can be galvanically connected to the negative load terminal 948. A current $I_9$ can flow out of the positive output terminal 932 into the location 954 such that the currents are added on the high voltage side of the isolated DC-DC converter 920.

By wiring the isolated DC-DC converter 920 in this manner, the auto-converter 940 can have the performance characteristics listed in Table 17 listed as a function of n.

TABLE 17

| Voltage Gain $G_{v9}$ | $\dfrac{n+1}{n}$ |
| --- | --- |
| Current Gain $G_{i9}$ | $\left(\dfrac{n}{n+1/\eta_b}\right)$ |
| Power Gain $G_{a9}$ | $n+1$ |
| Efficiency Rating $\eta_{a9}$ | $\dfrac{n+1}{n+1/\eta_b}$ |

When the output voltage $V_{out}$ of the isolated DC-DC converter 920 is 1 VDC, the output voltage $V_{out9}$ across the load terminals 946, 948 can have a −1 VDC offset and the performance characteristics listed in Table 18 can be achieved as a function of n.

TABLE 18

| Input Voltage $V_{in}$ | n |
| --- | --- |
| Input Voltage $V_{in9}$ | n |
| Output Voltage $V_{out9}$ | n + 1 |
| Input current $I_{in9}$ | $n + \dfrac{1}{\eta_b}$ |
| Input current $I_{in}$ | $\dfrac{1}{\eta_b}$ |
| Output current $I_{out9}$ | n |
| Output current $I_{out}$ | n |
| Current $I_9$ | n |

The auto-converter 940 can have a larger power gain $G_{a9}$, higher efficiency $\eta_{a9}$, and smaller voltage gain $G_{v9}$ than the conventional isolated DC-DC converter 20 illustrated in FIG. 1. As the value of n increases the power gain $G_{a9}$ increases, the efficiency $n_{a9}$ approaches unity, and the voltage gain $G_{v9}$ approaches unity. The efficiency $\eta_{a9}$ can dramatically increase for larger n values. The auto-converter 940 can effectively be a small boost positive converter. The auto-converter 940 can provide higher power throughput and better efficiency than conventional topologies and can be smaller, more lightweight, and less expensive.

Figure 11:
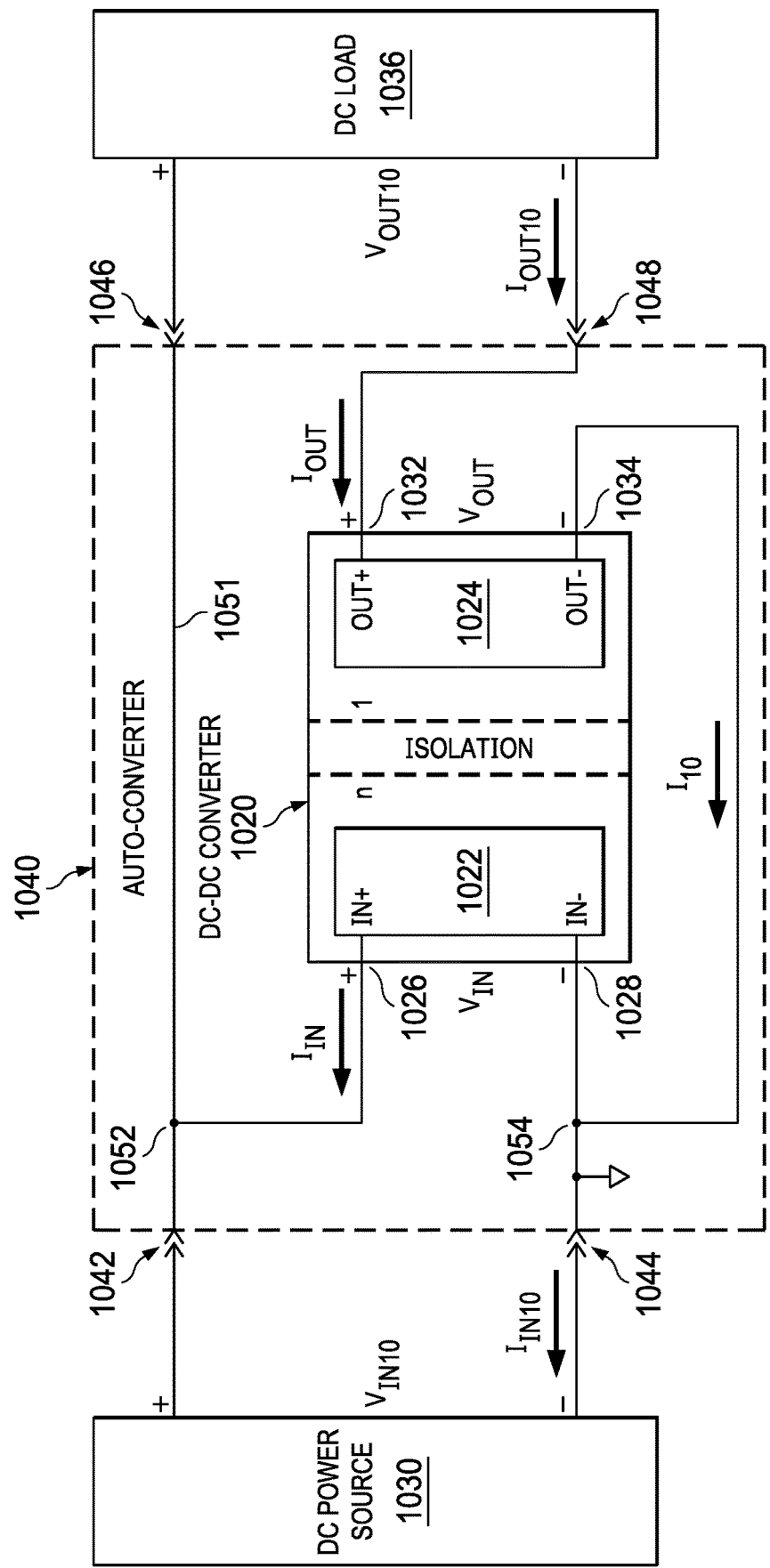
FIG. 11 is a schematic view depicting a DC-DC auto-converter module, in accordance with yet another embodiment.

FIG. 11 illustrates an alternative embodiment of an auto-converter 1040 that is similar to, or the same in many respects as, the auto-converter 940 of FIG. 10. For example, the auto-converter 1040 can include an isolated DC-DC converter 1020 that includes an input circuit 1022 and an output circuit 1024 that has a voltage ratio of n:1. The input circuit 1022 can include a positive input terminal 1026 and a negative input terminal 1028. The output circuit 1024 can include a positive output terminal 1032 and a negative output terminal 1034. The auto-converter 1040 can include a positive source terminal 1042, a negative source terminal 1044, a positive load terminal 1046, and a negative load terminal 1048.

A DC power source 1030 can provide DC input power $S_{in10}$ to the auto-converter 1040 in the form of an input current $I_{in10}$ at the negative source terminal 1044 at an input voltage $V_{in10}$ provided across the positive and negative source terminals 1042, 1044. The input current $I_{in10}$ can flow out of the negative source terminal 1044 and towards the DC power source 1030. DC output power $S_{a10}$ can be delivered to a DC load 1036 in the form of an output current $I_{out10}$ at the negative load terminal 1046 at an output voltage $V_{out10}$ provided across the positive and negative load terminals 1046, 1048. The output current $I_{out10}$ can flow out of the DC load 1036 and towards the negative load terminal 1048. The auto-converter 1040 can have a voltage gain $G_{v10}$ (defined as $V_{out10}/V_{in10}$), a current gain $G_{i10}$ (defined as $I_{out10}/I_{in10}$), a power gain $G_{a10}$ (defined as $S_{a10}/S_b$), and an efficiency rating $\eta_{a10}$ ($S_{a10}/S_{in10}$) which ideally is unity but, in reality, is less than unity.

The positive input terminal 1026 of the isolated DC-DC converter 1020 can be galvanically connected to the main bus 1051 at location 1052. The negative input terminal 1028 of the isolated DC-DC converter 1020 can be galvanically connected to the negative source terminal 1044. Different from the auto-converter 940, however, the positive output terminal 1032 of the isolated DC-DC converter 1020 can be galvanically connected to the negative load terminal 1048. The negative output terminal 1034 can be galvanically connected to the negative input terminal 1028 such that the negative input terminal 1028, the negative output terminal 1034, and the negative source terminal 1044 are galvanically connected together at location 1054. The positive output terminal 1032 can be galvanically connected to the negative load terminal 1048. A current $I_{10}$ can flow out of the negative output terminal 1034 into the location 1054 such that the currents are added on the high voltage side of the isolated DC-DC converter 1020.

By wiring the isolated DC-DC converter 1020 in this manner, the auto-converter 1040 can have the performance characteristics listed in Table 19 listed as a function of n.

TABLE 19

| Voltage Gain $G_{v10}$ | $\dfrac{n-1}{n}$ |
| --- | --- |
| Current Gain $G_{i10}$ | $\dfrac{n}{n-\dfrac{1}{\eta_b}}$ |
| Power Gain $G_{a10}$ | n − 1 |
| Efficiency Rating $\eta_{a10}$ | $\dfrac{n-1}{n-\eta_b}$ |

When the output voltage $V_{out}$ of the isolated DC-DC converter 1020 is 1 VDC, the output voltage $V_{out10}$ across the load terminals can have a 1 VDC offset and the performance characteristics listed in Table 20 can be achieved as a function of n.

TABLE 20

| | |
|---|---|
| Input Voltage $V_{in}$ | n |
| Input Voltage $V_{in10}$ | n |
| Output Voltage $V_{out10}$ | n − 1 |
| Input current $I_{in10}$ | n − $\eta_b$ |
| Input current $I_{in}$ | $\eta_b$ |
| Output current $I_{out10}$ | n |
| Output current $I_{out}$ | n |
| A current $I_{10}$ | n |

The auto-converter 1040 can have a larger power gain $G_{a10}$, higher efficiency $\eta_{a10}$, and smaller voltage gain $G_{v10}$ than the conventional isolated DC-DC converter 20 illustrated in FIG. 1. As the value of n increases the power gain $G_{a10}$ increases, the efficiency $\eta_{a10}$ approaches unity, and the voltage gain Gym approaches unity. The efficiency $\eta_{a10}$ can dramatically increase for larger n values. The auto-converter 1040 can effectively be a small buck negative converter and because the output current $I_{out}$ flows into the isolated DC-DC converter 1020 and the input current $I_{in}$ flows out of the isolated DC-DC converter 1020, the isolated DC-DC converter 1020 can instead be configured as a reverse converter.

Figure 12:
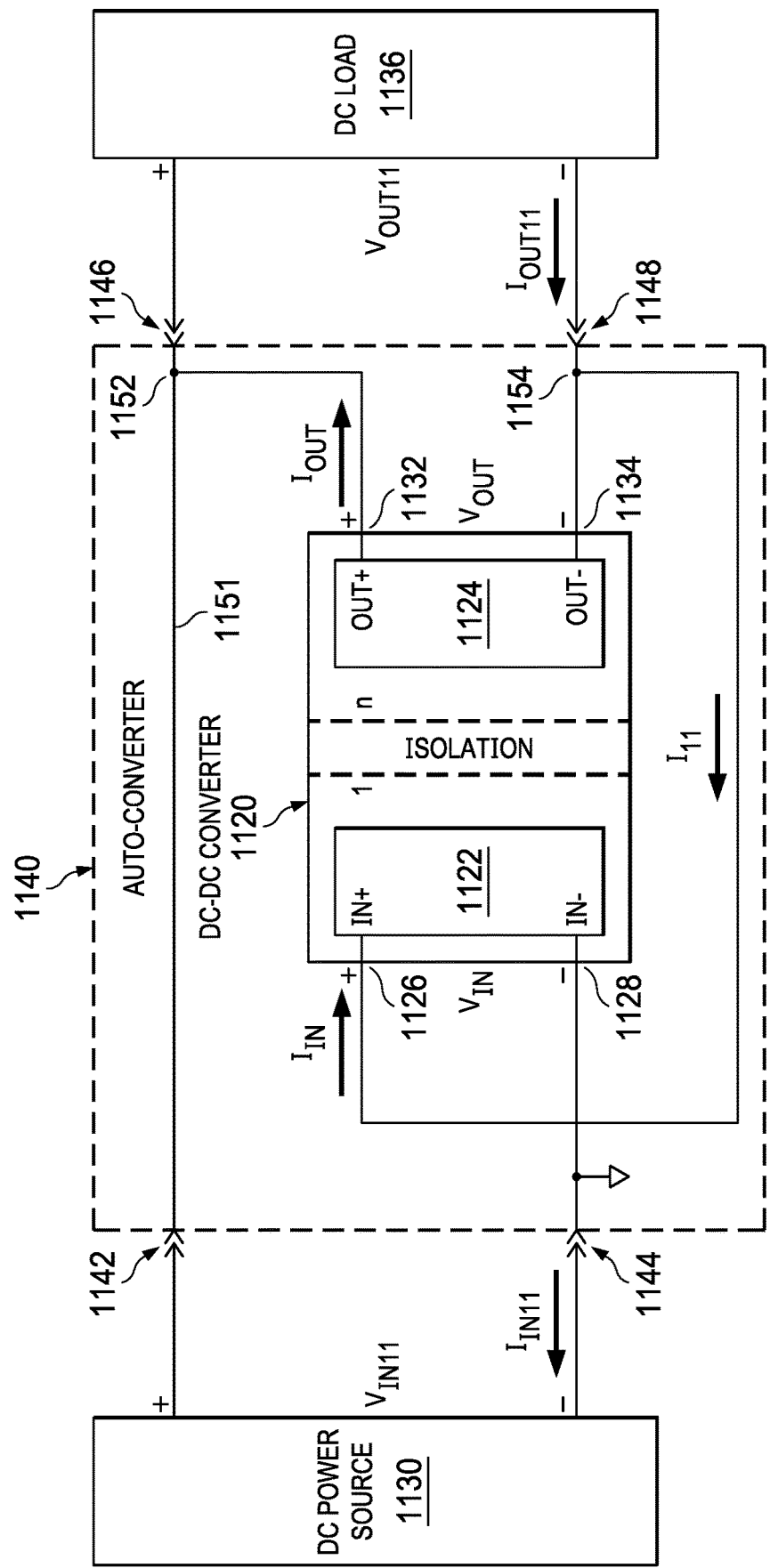
FIG. 12 is a schematic view depicting a DC-DC auto-converter module, in accordance with yet another embodiment.

FIG. 12 illustrates an alternative embodiment of an auto-converter 1140 that is similar to, or the same in many respects as, the auto-converter 940 of FIG. 10. For example, the auto-converter 1140 can include an isolated DC-DC converter 1120 that includes an input circuit 1122 and an output circuit 1124 that has a voltage ratio of 1:n. The input circuit 1122 can include a positive input terminal 1126 and a negative input terminal 1128. The output circuit 1124 can include a positive output terminal 1132 and a negative output terminal 1134. The auto-converter 1140 can include a positive source terminal 1142, a negative source terminal 1144, a positive load terminal 1146, and a negative load terminal 1148.

A DC power source 1130 can provide DC input power $S_{in11}$ to the auto-converter 1140 in the form of an input current $I_{in11}$ at the negative source terminal 1144 at an input voltage $V_{in11}$ provided across the positive and negative source terminals 1142, 1144. The input current $I_{in11}$ can flow out of the negative source terminal 1144 and towards the DC power source 1130. DC output power $S_{a11}$ can be delivered to a DC load 1136 in the form of an output current $I_{out11}$ at the negative load terminal 1148 at an output voltage $V_{out11}$ provided across the positive and negative load terminals 1146, 1148. The output current $I_{out11}$ can flow out of the DC load 1136 and towards the negative load terminal 1148. The auto-converter 1140 can have a voltage gain $G_{v11}$ (defined as $V_{out11}/V_{in11}$), a current gain $G_{i11}$ (defined as $I_{out11}/I_{in11}$) a power gain $G_{a11}$ (defined as $S_{a11}/S_b$), and an efficiency rating $\eta_{a11}$ (defined as $S_{a11}/S_{i11}$) which ideally is unity but, in reality, is less than unity.

The negative input terminal 1128 of the isolated DC-DC converter 1120 can be galvanically connected to the negative source terminal 1144. The negative output terminal 1134 of the isolated DC-DC converter 1120 can be galvanically connected to the negative load terminal 1148. Different from the auto-converter 940, however, the input circuit 1122 and the output circuit 1124 have a voltage ratio of 1:n. In addition, the positive input terminal 1126 of the isolated DC-DC converter 1120 can be galvanically connected to the negative output terminal 1134 such that the positive input terminal 1126, the negative output terminal 1134, and the negative load terminal 1148 are galvanically connected together at location 1154. The positive output terminal 1132 of the isolated DC-DC converter 1120 can be galvanically connected to the main bus 1151 at location 1152. A current $I_{11}$ can flow into the positive input terminal 1126 from the location 1154 such that the currents are added on the high voltage side of the isolated DC-DC converter 1120.

By wiring the isolated DC-DC converter 1120 in this manner, the auto-converter 1140 can have the performance characteristics listed in Table 21 listed as a function of n.

TABLE 21

| | |
|---|---|
| Voltage Gain $G_{v11}$ | $\dfrac{n}{n+1}$ |
| Current Gain $G_{i11}$ | $1 + \dfrac{\eta_b}{n}$ |
| Power Gain $G_{a11}$ | $1 + \dfrac{1}{n \ast \eta_b}$ |
| Efficiency Rating $\eta_{a11}$ | $\dfrac{n + \eta_b}{n+1}$ |

When the input voltage $V_{in}$ of the isolated DC-DC converter 1120 is n VDC, the output voltage $V_{out11}$ across the load terminals can have a 1 VDC offset and the performance characteristics listed in Table 22 can be achieved as a function of n.

TABLE 22

| | |
|---|---|
| Output Voltage $V_{out}$ | n |
| Input Voltage $V_{in11}$ | n + 1 |
| Output Voltage $V_{out11}$ | n |
| Input current $I_{in11}$ | $\dfrac{n}{\eta_b}$ |
| Input current $I_{in}$ | $\dfrac{n}{\eta_b}$ |
| Output current $I_{out11}$ | $\dfrac{n}{\eta_b} + 1$ |
| Output current $I_{out}$ | 1 |
| A current $I_{11}$ | $\dfrac{n}{\eta_b}$ |

The auto-converter 1140 can have a larger power gain $G_{a11}$, higher efficiency $\eta_{a11}$, and smaller voltage gain $G_{v11}$ than the conventional isolated DC-DC converter 20 illustrated in FIG. 1. As the value of n increases the power gain $G_{a11}$ increases, the efficiency $\eta_{a11}$ approaches unity, and the voltage gain $G_{v11}$ approaches unity. The efficiency $\eta_{a11}$ can dramatically increase for larger n values. The auto-converter 1140 can effectively be a small buck positive converter.

Figure 13:
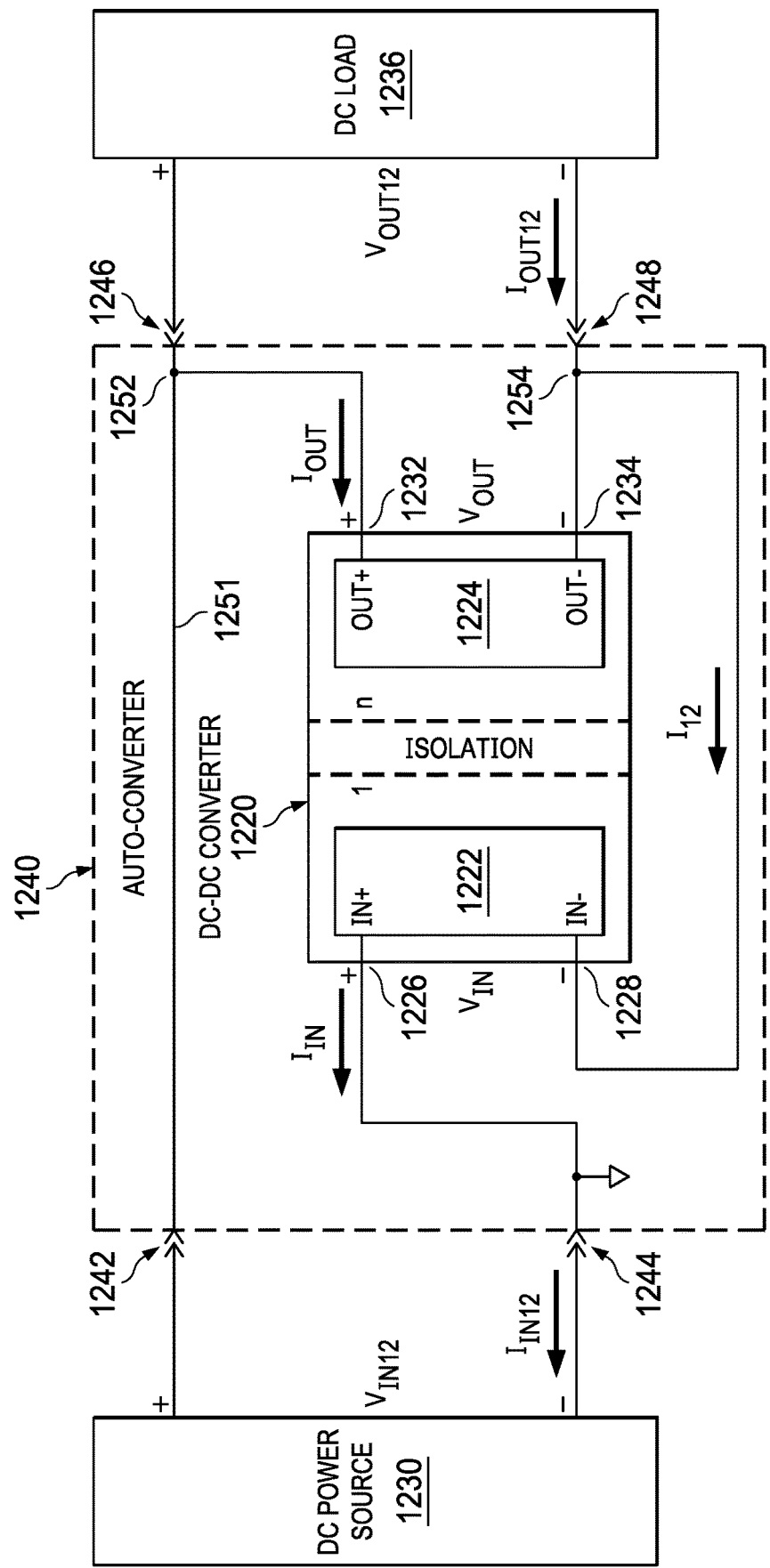
FIG. 13 is a schematic view depicting a DC-DC auto-converter module, in accordance with yet another embodiment.

FIG. 13 illustrates an alternative embodiment of an auto-converter 1240 that is similar to, or the same in many respects as, the auto-converter 940 of FIG. 10. For example, the auto-converter 1240 can include an isolated DC-DC converter 1220 that includes an input circuit 1222 and an output circuit 1224 that has a voltage ratio of 1:n. The input circuit 1222 can include a positive input terminal 1226 and a negative input terminal 1228. The output circuit 1224 can include a positive output terminal 1232 and a negative output terminal 1234. The auto-converter 1240 can include a positive source terminal 1242, a negative source terminal 1244, a positive load terminal 1246, and a negative load terminal 1248.

A DC power source 1230 can provide DC input power $S_{in12}$ to the auto-converter 1240 in the form of an input current $I_{in12}$ at the negative source terminal 1244 at an input voltage $V_{in12}$ provided across the positive and negative source terminals 1242, 1244. The input current $I_{in12}$ can flow out of the negative source terminal 1244 and towards the DC power source 1230. DC output power $S_{a12}$ can be delivered to a DC load 1236 in the form of an output current $I_{out12}$ at the negative load terminal 1248 at an output voltage $V_{out12}$ provided across the positive and negative load terminals 1246, 1248. The output current $I_{out12}$ can flow out of the DC load 1236 and towards the negative load terminal 1248. The auto-converter 1240 can have a voltage gain $G_{v12}$ (defined as $V_{out12}/V_{in12}$), a current gain $G_{i12}$ (defined as $I_{out12}/I_{in12}$), a power gain $G_{a12}$ (defined as $S_{a12}/S_b$), and an efficiency rating $\eta_{a12}$ (defined as $S_{a12}/S_{in12}$) which ideally is unity but, in reality, is less than unity.

The negative output terminal 1234 of the isolated DC-DC converter 1220 can be galvanically connected to the negative load terminal 1248. Different from the auto-converter 940, however, the input circuit 1222 and the output circuit 1224 have a voltage ratio of 1:n. In addition, the positive input terminal 1226 of the isolated DC-DC converter 1220 can be galvanically connected to the negative source terminal 1244. The negative input terminal 1228 can be galvanically connected to the negative output terminal 1234 such that the negative input terminal 1228, the negative output terminal 1234, and the negative load terminal 1248 are galvanically connected together at location 1254. The positive output terminal 1232 of the isolated DC-DC converter 1220 can be galvanically connected to the main bus 1251 at location 1252. A current $I_{12}$ can flow into the negative input terminal 1228 from the location 1254 such that the currents are added on the high voltage side of the isolated DC-DC converter 1220.

By wiring the isolated DC-DC converter 1220 in this manner, the auto-converter 1240 can have the performance characteristics listed in Table 23 listed as a function of n.

TABLE 23

| | |
|---|---|
| Voltage Gain $G_{v12}$ | $\dfrac{n}{n-1}$ |
| Current Gain $G_{i12}$ | $1 - \dfrac{1}{n*\eta_b}$ |
| Power Gain $G_{a12}$ | $n * \eta_b - 1$ |
| Efficiency Rating $\eta_{a12}$ | $\dfrac{n - \dfrac{1}{\eta_b}}{n-1}$ |

When the input voltage $V_{in}$ of the isolated DC-DC converter 1220 is 1 VDC, the output voltage $V_{out12}$ across the load terminals can have a −1 VDC offset and the performance characteristics listed in Table 24 can be achieved as a function of n.

TABLE 24

| | |
|---|---|
| Output Voltage $V_{out}$ | n |
| Input Voltage $V_{in12}$ | n − 1 |
| Output Voltage $V_{out12}$ | n |
| Input current $I_{in12}$ | $n * \eta_b$ |
| Input current $I_{in}$ | $n * \eta_b$ |

TABLE 24-continued

| | |
|---|---|
| Output current $I_{out12}$ | $n * \eta_b - 1$ |
| Output current $I_{out}$ | 1 |
| A current $I_{12}$ | $n * \eta_b$ |

The auto-converter 1240 can have a larger power gain $G_{a12}$, higher efficiency $\eta_{a12}$, and smaller voltage gain $G_{v12}$ than the conventional isolated DC-DC converter 20 illustrated in FIG. 1. As the value of n increases the power gain $G_{a12}$ increases, the efficiency $\eta_{a12}$ approaches unity, and the voltage gain $G_{v12}$ approaches unity. The efficiency $\eta_{a12}$ can dramatically increase for larger n values. The auto-converter 1240 can effectively be a small boost negative converter and because the output current $I_{out}$ flows into the isolated DC-DC converter 1220 and the input current $I_{in}$ flows out of the isolated DC-DC converter 1220, the isolated DC-DC converter 1020 can instead be configured as a reverse converter.

Figure 14:
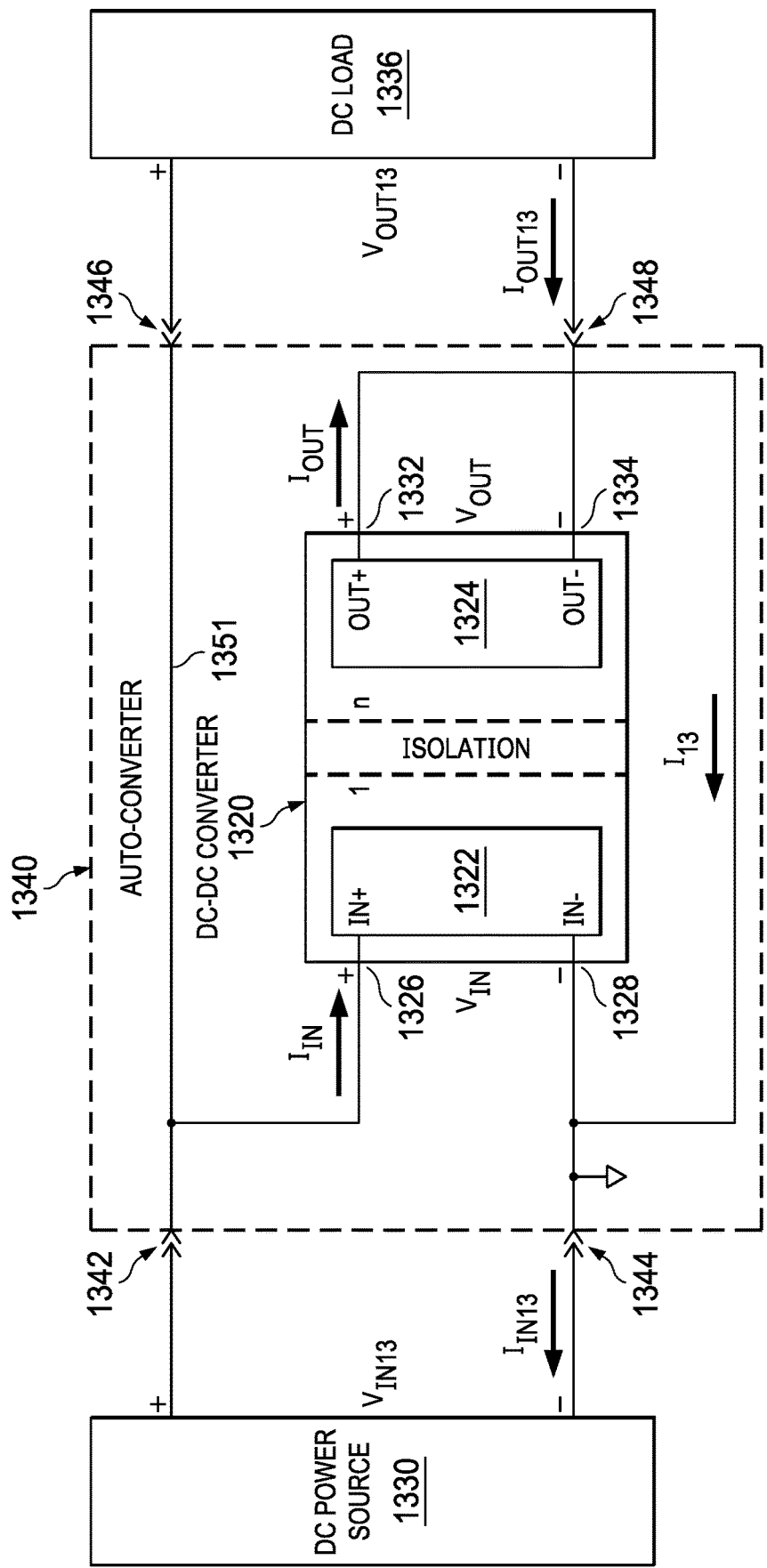
FIG. 14 is a schematic view depicting a DC-DC auto-converter module, in accordance with yet another embodiment.

FIG. 14 illustrates an alternative embodiment of an auto-converter 1340 that is similar to, or the same in many respects as, the auto-converter 940 of FIG. 10. For example, the auto-converter 1340 can include an isolated DC-DC converter 1320 that includes an input circuit 1322 and an output circuit 1324. The input circuit 1322 can include a positive input terminal 1326 and a negative input terminal 1328. The output circuit 1324 can include a positive output terminal 1332 and a negative output terminal 1334. An input current $I_{in}$ can be present at the positive input terminal 1326 and an output current $I_{out}$ can be present at the positive output terminal 1332. The auto-converter 1340 can include a positive source terminal 1342, a negative source terminal 1344, a positive load terminal 1346, and a negative load terminal 1348. A DC power source 1330 can provide DC input power $S_{in13}$ to the auto-converter 1340 in the form of an input current $I_{in13}$ at the positive source terminal 1342 at an input voltage $V_{in13}$ provided across the positive and negative source terminals 1342, 1344. During operation, a current $I_{13}$ can be generated.

DC output power $S_{a13}$ can be delivered to a DC load 1336 in the form of an output current $I_{out13}$ at the positive load terminal 1346 at an output voltage $V_{out13}$ provided across the positive and negative load terminals 1346, 1348. The auto-converter 1340 can have a voltage gain $G_{v13}$ (defined as $V_{out13}/V_{in13}$), a current gain $G_{i13}$ (defined as $I_{out13}/I_{in13}$), a power gain $G_{a13}$ (defined as $S_{a13}/S_b$), and an efficiency rating $\eta_{a13}$ ($S_{a13}/S_{in13}$) which ideally is unity but, in reality, is less than unity. The auto-converter 1340 can be different from the auto-converter 940 in that the input circuit 1322 and the output circuit 1324 has a voltage ratio of 1:n.

By wiring the isolated DC-DC converter 1320 in this manner, the auto-converter 1340 can have the performance characteristics listed in Table 25 listed as a function of n.

TABLE 25

| | |
|---|---|
| Voltage Gain $G_{v13}$ | n + 1 |
| Current Gain $G_{i13}$ | $\dfrac{1}{\dfrac{n}{\eta_b} + 1}$ |
| Power Gain $G_{a13}$ | $\dfrac{n+1}{n}$ |
| Efficiency Rating $\eta_{a13}$ | $\dfrac{n+1}{n/\eta_b + 1}$ |

When the input voltage $V_{in}$ of the isolated DC-DC converter 1320 is 1 VDC, the output voltage $V_{out13}$ across the load terminals can have an offset of −n VDC and the performance characteristics listed in Table 22 can be achieved as a function of n.

TABLE 26

| | |
|---|---|
| Output Voltage $V_{out}$ | n |
| Input Voltage $V_{in13}$ | 1 |
| Output Voltage $V_{out13}$ | n + 1 |
| Input current $I_{in13}$ | $\frac{n}{\eta_b} + 1$ |
| Input current $I_{in}$ | $\frac{n}{\eta_b}$ |
| Output current $I_{out13}$ | 1 |
| Output current $I_{out}$ | 1 |
| A current $I_{13}$ | 1 |

The auto-converter 1340 can have a smaller power gain $G_{a13}$ (e.g., closer to unity) and an efficiency $\eta_{a13}$ that approaches the efficiency $\eta_b$ of the isolated DC-DC converter 1320 than the conventional isolated DC-DC converter 20 illustrated in FIG. 1. As the value of n increases, the power gain $G_{a13}$ decreases (e.g., towards unity) and the efficiency $\eta_{a13}$ of the auto-converter 1340 approaches the efficiency $\eta_b$ of the isolated DC-DC converter 1320.

Figure 15:
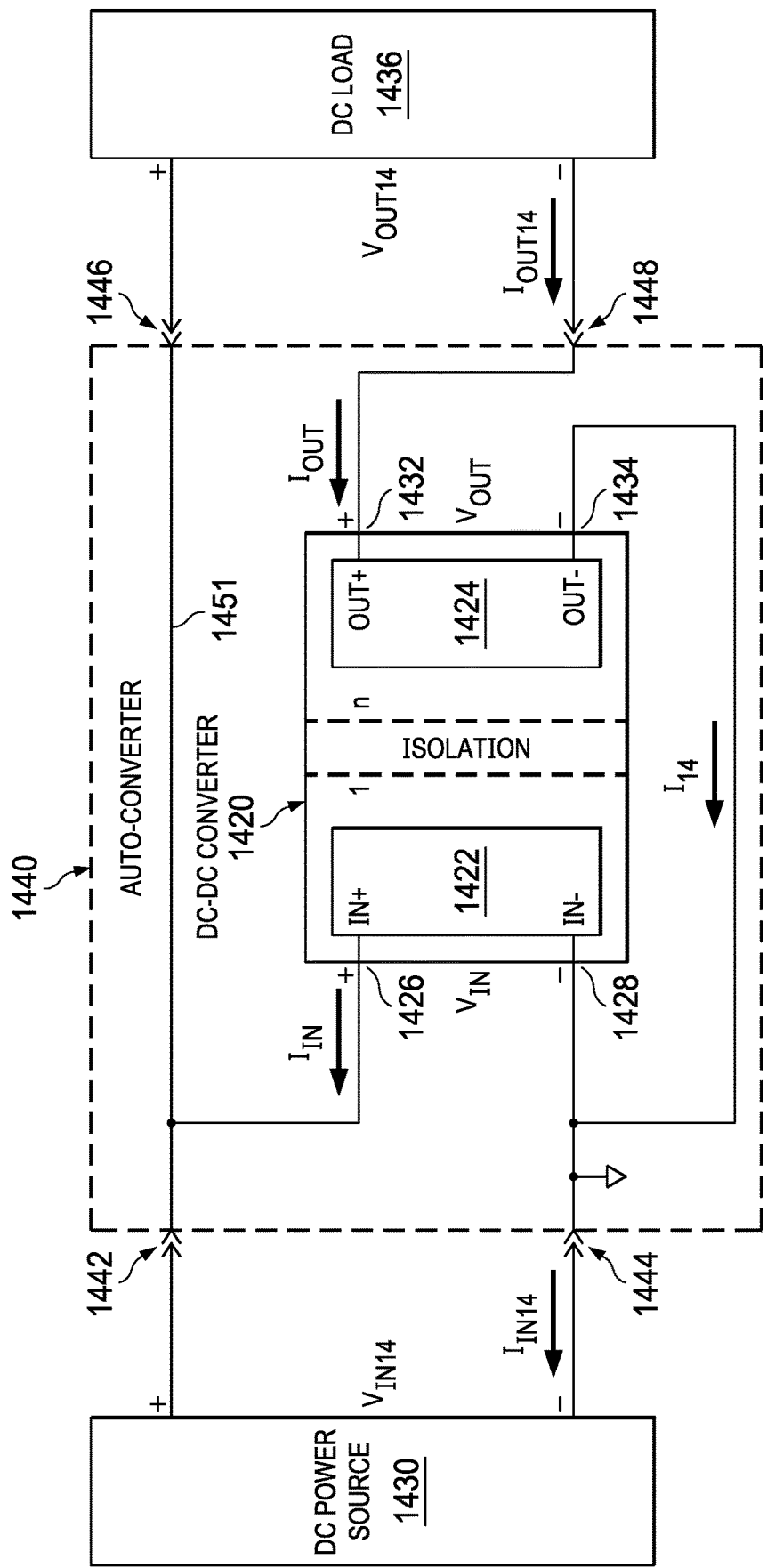
FIG. 15 is a schematic view depicting a DC-DC auto-converter module, in accordance with yet another embodiment.

FIG. 15 illustrates an alternative embodiment of an auto-converter 1440 that is similar to, or the same in many respects as, the auto-converter 1040 of FIG. 11. For example, the auto-converter 1440 can include an isolated DC-DC converter 1420 that includes an input circuit 1422 and an output circuit 1424. The input circuit 1422 can include a positive input terminal 1426 and a negative input terminal 1428. The output circuit 1424 can include a positive output terminal 1432 and a negative output terminal 1434. An input current $I_{in}$ can be present at the positive input terminal 1426 and an output current $I_{out}$ can be present at the positive output terminal 1432. The auto-converter 1440 can include a positive source terminal 1442, a negative source terminal 1444, a positive load terminal 1446, and a negative load terminal 1448. A DC power source 1430 can provide DC input power $S_{in14}$ to the auto-converter 1440 in the form of an input current $I_{in14}$ at the positive source terminal 1442 at an input voltage $V_{in14}$ provided across the positive and negative source terminals 1442, 1444. During operation, a current $I_{14}$ can be generated.

DC output power $S_{a14}$ can be delivered to a DC load 1436 in the form of an output current $I_{out14}$ at the positive load terminal 1446 at an output voltage $V_{out14}$ provided across the positive and negative load terminals 1446, 1448. The auto-converter 1440 can have a voltage gain $G_{v14}$ (defined as $V_{out14}/V_{in14}$), a current gain $G_{i14}$ (defined as $I_{out14}/I_{in14}$), a power gain $G_{a14}$ (defined as $S_{a14}/S_b$), and an efficiency rating $\eta_{a14}$ ($S_{a14}/S_{in14}$) which ideally is unity but, in reality, is less than unity. The auto-converter 1440 can be different from the auto-converter 1140 in that the input circuit 1422 and the output circuit 1424 has a voltage ratio of n:1.

By wiring the isolated DC-DC converter 1420 in this manner, the auto-converter 1440 can have the performance characteristics listed in Table 27 listed as a function of n.

TABLE 27

| | |
|---|---|
| Voltage Gain $G_{v14}$ | −(n − 1) |
| Current Gain $G_{i14}$ | $-\frac{1}{n*\eta_b - 1}$ |

TABLE 27-continued

| | |
|---|---|
| Power Gain $G_{a14}$ | $\frac{-(n-1)}{n}$ |
| Efficiency Rating $\eta_{a14}$ | $\frac{n*\eta_b - 1}{n - 1}$ |

When the input voltage $V_{in}$ of the isolated DC-DC converter 1420 is 1 VDC, the output voltage $V_{out14}$ across the load terminals can have an offset of +n VDC and the performance characteristics listed in Table 28 can be achieved as a function of n.

TABLE 28

| | |
|---|---|
| Output Voltage $V_{out}$ | n |
| Input Voltage $V_{in14}$ | 1 |
| Output Voltage $V_{out14}$ | −(n − 1) |
| Input current $I_{in14}$ | −(n * $\eta_b$ − 1) |
| Input current $I_{in}$ | n * $\eta_b$ |
| Output current $I_{out14}$ | 1 |
| Output current $I_{out}$ | 1 |
| A current $I_{14}$ | 1 |

The auto-converter 1440 can have a smaller power gain $G_{a14}$ (e.g., closer to unity) and an efficiency $\eta_{a14}$ that approaches the efficiency $\eta_b$ of the isolated DC-DC converter 1420 than the conventional isolated DC-DC converter 20 illustrated in FIG. 1. As the value of n increases, the power gain $G_{a14}$ decreases (e.g., towards unity) and the efficiency $\eta_{a14}$ of the auto-converter 1440 approaches the efficiency $\eta_b$ of the isolated DC-DC converter 1420.

Figure 16:
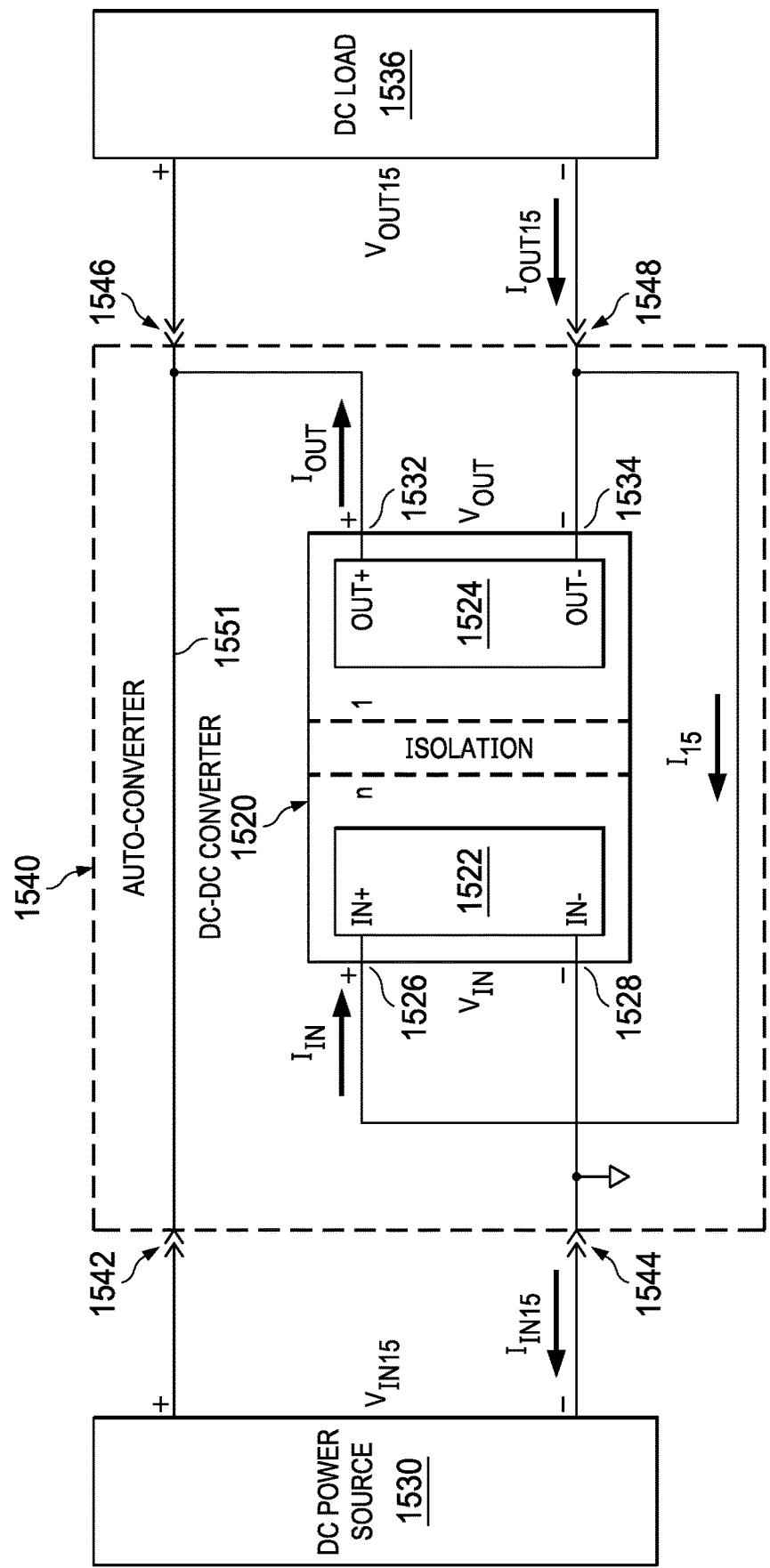
FIG. 16 is a schematic view depicting a DC-DC auto-converter module, in accordance with yet another embodiment.

FIG. 16 illustrates an alternative embodiment of an auto-converter 1540 that is similar to, or the same in many respects as, the auto-converter 1140 of FIG. 12. For example, the auto-converter 1540 can include an isolated DC-DC converter 1520 that includes an input circuit 1522 and an output circuit 1524. The input circuit 1522 can include a positive input terminal 1526 and a negative input terminal 1528. The output circuit 1524 can include a positive output terminal 1532 and a negative output terminal 1534. An input current $I_{in}$ can be present at the positive input terminal 1526 and an output current $I_{out}$ can be present at the positive output terminal 1532. The auto-converter 1540 can include a positive source terminal 1542, a negative source terminal 1544, a positive load terminal 1546, and a negative load terminal 1548. A DC power source 1530 can provide DC input power $S_{in15}$ to the auto-converter 1540 in the form of an input current $I_{in15}$ at the positive source terminal 1542 at an input voltage $V_{in15}$ provided across the positive and negative source terminals 1542, 1544. During operation, a current $I_{15}$ can be generated.

DC output power $S_{a15}$ can be delivered to a DC load 1536 in the form of an output current $I_{out15}$ at the positive load terminal 1546 at an output voltage $V_{out15}$ provided across the positive and negative load terminals 1546, 1548. The auto-converter 1540 can have a voltage gain $G_{v15}$ (defined as $V_{out15}/V_{in15}$), a current gain $G_{i15}$ (defined as $I_{out15}/I_{in15}$), a power gain $G_{a15}$ (defined as $S_{a15}/S_b$), and an efficiency rating $\eta_{a15}$ ($S_{a15}/S_{in15}$) which ideally is unity but, in reality, is less than unity. The auto-converter 1540 can be different from the auto-converter 1140 in that the input circuit 1522 and the output circuit 1524 has a voltage ratio of n:1.

By wiring the isolated DC-DC converter 1520 in this manner, the auto-converter 1540 can have the performance characteristics listed in Table 29 listed as a function of n.

TABLE 29

| | |
|---|---|
| Voltage Gain $G_{v15}$ | $\frac{1}{n+1}$ |
| Current Gain $G_{i15}$ | $n * \eta_b + 1$ |
| Power Gain $G_{a15}$ | $1 + \frac{1}{n * \eta_b}$ |
| Efficiency Rating $\eta_{a15}$ | $\frac{n * \eta_b + 1}{n+1}$ |

When the output voltage $V_{out}$ of the isolated DC-DC converter 1520 is 1 VDC, the output voltage $V_{out15}$ across the load terminals can have an offset of +n VDC and the performance characteristics listed in Table 30 can be achieved as a function of n.

TABLE 30

| | |
|---|---|
| Input Voltage $V_{in}$ | n |
| Input Voltage $V_{in15}$ | n + 1 |
| Output Voltage $V_{out15}$ | 1 |
| Input current $I_{in15}$ | $\frac{1}{\eta_b}$ |
| Input current $I_{in}$ | $\frac{1}{\eta_b}$ |
| Output current $I_{out15}$ | $n + \frac{1}{\eta_b}$ |
| Output current $I_{out}$ | n |
| A current $I_{15}$ | $\frac{1}{\eta_b}$ |

The auto-converter 1540 can have a smaller power gain $G_{a15}$ (e.g., closer to unity) and an efficiency $\eta_{a15}$ that approaches the efficiency $\eta_b$ of the isolated DC-DC converter 1520 than the conventional isolated DC-DC converter 20 illustrated in FIG. 1. As the value of n increases, the power gain $G_{a15}$ decreases (e.g., towards unity) and the efficiency $\eta_{a15}$ of the auto-converter 1540 approaches the efficiency $\eta_b$ of the isolated DC-DC converter 1520.

Figure 17:
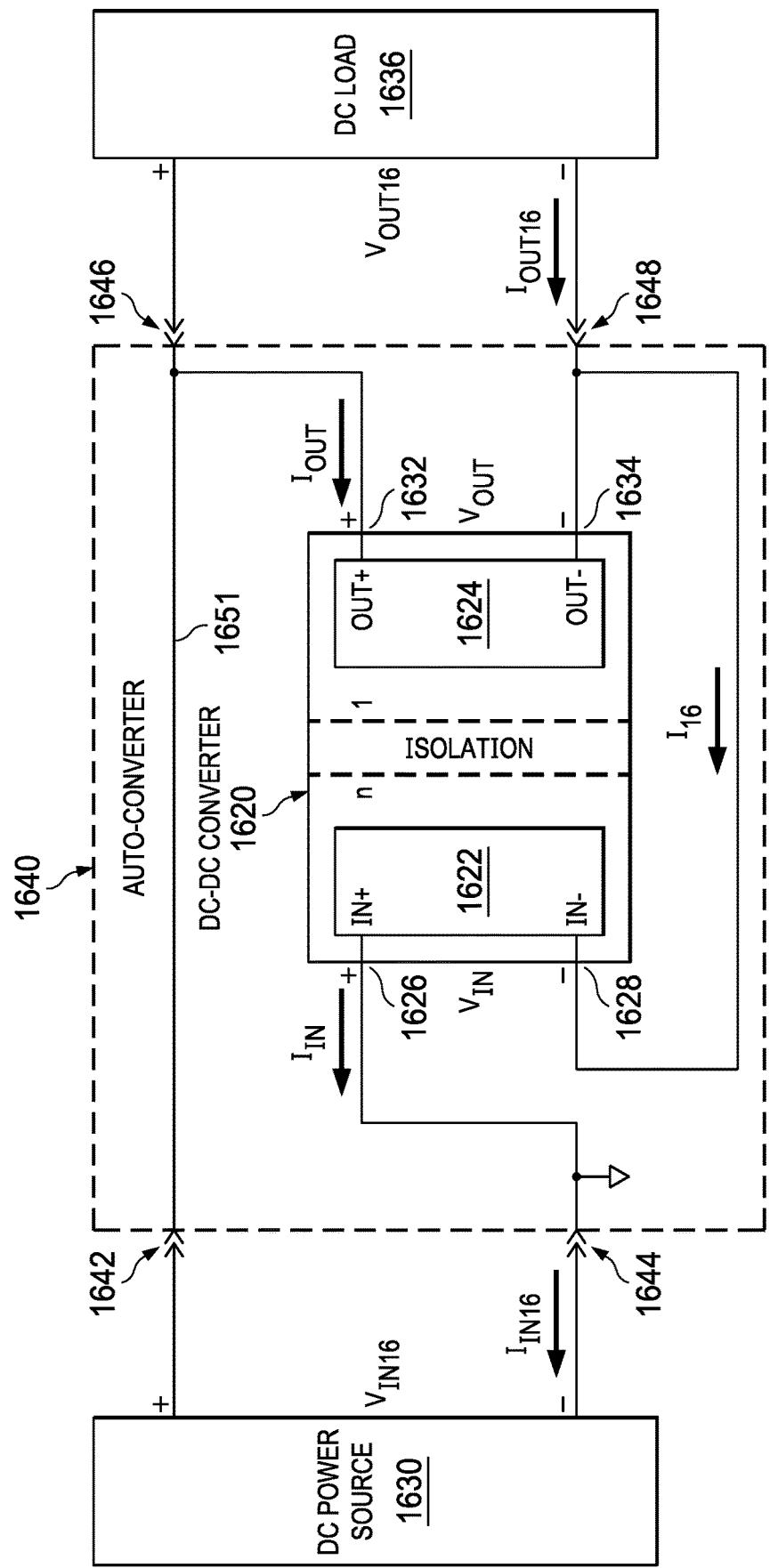
FIG. 17 is a schematic view depicting a DC-DC auto-converter module, in accordance with yet another embodiment.

FIG. 17 illustrates an alternative embodiment of an auto-converter 1640 that is similar to, or the same in many respects as, the auto-converter 1240 of FIG. 13. For example, the auto-converter 1640 can include an isolated DC-DC converter 1620 that includes an input circuit 1622 and an output circuit 1624. The input circuit 1622 can include a positive input terminal 1626 and a negative input terminal 1628. The output circuit 1624 can include a positive output terminal 1632 and a negative output terminal 1634. An input current $I_{in}$ can be present at the positive input terminal 1626 and an output current $I_{out}$ can be present at the positive output terminal 1632. The auto-converter 1640 can include a positive source terminal 1642, a negative source terminal 1644, a positive load terminal 1646, and a negative load terminal 1648. A DC power source 1630 can provide DC input power $S_{in16}$ to the auto-converter 1640 in the form of an input current $I_{in16}$ at the positive source terminal 1642 at an input voltage $V_{in16}$ provided across the positive and negative source terminals 1642, 1644. During operation, a current $I_{16}$ can be generated.

DC output power $S_{a16}$ can be delivered to a DC load 1636 in the form of an output current $I_{out16}$ at the positive load terminal 1646 at an output voltage $V_{out16}$ provided across the positive and negative load terminals 1646, 1648. The auto-converter 1640 can have a voltage gain $G_{v16}$ (defined as $V_{out16}/V_{in16}$), a current gain $G_{i16}$ (defined as $I_{out16}/I_{in16}$), a power gain $G_{a16}$ (defined as $S_{a16}/S_b$), and an efficiency rating $\eta_{a16}$ ($S_{a16}/S_{in16}$) which ideally is unity but, in reality, is less than unity. The auto-converter 1640 can be different from the auto-converter 1240 in that the input circuit 1622 and the output circuit 1624 has a voltage ratio of n:1.

By wiring the isolated DC-DC converter 1620 in this manner, the auto-converter 1640 can have the performance characteristics listed in Table 31 listed as a function of n.

TABLE 31

| | |
|---|---|
| Voltage Gain $G_{v16}$ | $\frac{-1}{n-1}$ |
| Current Gain $G_{i16}$ | $\frac{-(n - \eta_b)}{\eta_b}$ |
| Power Gain $G_{a16}$ | $-\left(1 + \frac{1}{n * \eta_b}\right)$ |
| Efficiency Rating $\eta_{a16}$ | $\frac{n-1}{n/\eta_b - 1}$ |

When the output voltage $V_{out}$ of the isolated DC-DC converter 1620 is 1 VDC, the output voltage $V_{out16}$ across the load terminals can have an offset of −n VDC and the performance characteristics listed in Table 32 can be achieved as a function of n.

TABLE 32

| | |
|---|---|
| Input Voltage $V_{in}$ | n |
| Input Voltage $V_{in16}$ | −(n − 1) |
| Output Voltage $V_{out16}$ | 1 |
| Input current $I_{in16}$ | $\eta_b$ |
| Input current $I_{in}$ | $\eta_b$ |
| Output current $I_{out16}$ | −(n − $\eta_b$) |
| Output current $I_{out}$ | n |
| A current $I_{16}$ | $\eta_b$ |

The auto-converter 1640 can have a smaller power gain $G_{a16}$ (e.g., closer to unity) and an efficiency $\eta_{a16}$ that approaches the efficiency $\eta_b$ of the isolated DC-DC converter 1620 than the conventional isolated DC-DC converter 20 illustrated in FIG. 1. As the value of n increases, the power gain $G_{a16}$ decreases (e.g., towards unity) and the efficiency $\eta_{a16}$ of the auto-converter 1640 approaches the efficiency $\eta_b$ of the isolated DC-DC converter 1620.

The foregoing description of embodiments and examples of the disclosure has been presented for purposes of illustration and description. It is not intended to be exhaustive or to limit the disclosure to the forms described. Numerous modifications are possible in light of the above teachings. Some of those modifications have been discussed and others will be understood by those skilled in the art. The embodiments were chosen and described in order to best illustrate the principles of the disclosure and various embodiments as are suited to the particular use contemplated. The scope of the disclosure is, of course, not limited to the examples or embodiments set forth herein, but can be employed in any number of applications and equivalent devices by those of ordinary skill in the art. Rather it is hereby intended the scope of the invention be defined by the claims appended hereto. Also, for any methods claimed and/or described, regardless of whether the method is described in conjunction with a flow diagram, it should be understood that unless otherwise specified or required by context, any explicit or implicit ordering of steps performed in the execution of a method does not imply that those steps must be performed in the order presented and may be performed in a different order or in parallel.

What is claimed is:

1. A DC-DC auto-converter module comprising:
    a positive source terminal;
    a negative source terminal that cooperates with the positive source terminal to facilitate electrical connection of a DC power source to the auto-converter module;
    a positive load terminal;
    a negative load terminal that cooperates with the positive load terminal to facilitate connection of an electrical load to the auto-converter module;
    a ground bus galvanically connected to the negative source terminal and the negative load terminal; and
    an isolated DC-DC converter that comprises:
        an input circuit that comprises:
            a positive input terminal that is galvanically connected to the positive source terminal; and
            a negative input terminal that is galvanically connected to the ground bus; and
        an output circuit that is galvanically isolated from the input circuit and comprises:
            a positive output terminal; and
            a negative output terminal, wherein:
                the positive output terminal is galvanically connected to the positive input terminal and the negative output terminal is galvanically connected to the positive load terminal; and
                the input circuit and the output circuit are galvanically isolated from each other.

2. The DC-DC auto-converter module of claim 1 wherein the isolated DC-DC converter has a voltage ratio of n:1, where n is greater than 1.

3. The DC-DC auto-converter module of claim 1 wherein the isolated DC-DC converter has a voltage ratio of 1:n, where n is greater than 1.

4. A DC-DC auto-converter module comprising:
    a positive source terminal;
    a negative source terminal that cooperates with the positive source terminal to facilitate electrical connection of a DC power source to the auto-converter module;
    a positive load terminal;
    a negative load terminal that cooperates with the positive load terminal to facilitate connection of an electrical load to the auto-converter module;
    a main bus galvanically connected to the positive source terminal and the positive load terminal; and
    an isolated DC-DC converter that comprises:
        an input circuit that comprises:
            a positive input terminal that is galvanically connected to the main bus; and
            a negative input terminal that is galvanically connected to the negative source terminal; and
        an output circuit that is galvanically isolated from the input circuit and comprises:
            a positive output terminal; and
            a negative output terminal, wherein:
                the positive output terminal is galvanically connected to the negative load terminal and the negative output terminal is galvanically connected to the negative input terminal; and
                the input circuit and the output circuit are galvanically isolated from each other.

5. The DC-DC auto-converter module of claim 4 wherein the isolated DC-DC converter has a voltage ratio of n:1, where n is greater than 1.

6. The DC-DC auto-converter module of claim 4 wherein the isolated DC-DC converter has a voltage ratio of 1:n, where n is greater than 1.

7. A DC-DC auto-converter module comprising:
    a positive source terminal;
    a negative source terminal that cooperates with the positive source terminal to facilitate electrical connection of a DC power source to the auto-converter module;
    a positive load terminal;
    a negative load terminal that cooperates with the positive load terminal to facilitate connection of an electrical load to the auto-converter module;
    a main bus galvanically connected to the positive source terminal and the positive load terminal; and
    an isolated DC-DC converter that comprises:
        an input circuit that comprises:
            a positive input terminal; and
            a negative input terminal; and
        an output circuit that is galvanically isolated from the input circuit and comprises:
            a positive output terminal that is galvanically connected to the main bus; and
            a negative output terminal that is galvanically connected to the negative load terminal, wherein:
                the positive input terminal is galvanically connected to the negative source terminal and the negative input terminal is galvanically connected to the negative output terminal; and
                the input circuit and the output circuit are galvanically isolated from each other.

8. The DC-DC auto-converter module of claim 7 wherein the isolated DC-DC converter has a voltage ratio of n:1, where n is greater than 1.

9. The DC-DC auto-converter module of claim 7 wherein the isolated DC-DC converter has a voltage ratio of 1:n, where n is greater than 1.

* * * * *